United States Patent
Araki

(10) Patent No.: US 10,476,532 B2
(45) Date of Patent: Nov. 12, 2019

(54) MULTIPLEXER, TRANSMISSION APPARATUS, AND RECEPTION APPARATUS

(71) Applicant: Murata Manufacturing Co., Ltd., Nagaokakyo-shi, Kyoto-fu (JP)

(72) Inventor: Masato Araki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/881,944

(22) Filed: Jan. 29, 2018

(65) Prior Publication Data
US 2018/0152210 A1 May 31, 2018

Related U.S. Application Data

(63) Continuation-in-part of application No. 15/440,539, filed on Feb. 23, 2017, now Pat. No. 9,917,603.

(51) Int. Cl.
  *H04B 1/00* (2006.01)
  *H04J 1/04* (2006.01)
  *H04B 1/40* (2015.01)

(52) U.S. Cl.
  CPC ............. *H04B 1/0057* (2013.01); *H04B 1/40* (2013.01); *H04J 1/045* (2013.01)

(58) Field of Classification Search
  CPC ................................ H04B 1/0057; H04J 1/045
  See application file for complete search history.

(56) References Cited

U.S. PATENT DOCUMENTS

| | | | | |
|---|---|---|---|---|
| 5,734,352 A | * | 3/1998 | Seward | H01Q 21/30 343/715 |
| 6,297,711 B1 | * | 10/2001 | Seward | H01Q 1/3266 333/129 |
| 6,384,696 B1 | * | 5/2002 | Miller | H03H 7/463 333/132 |
| 6,396,365 B1 | * | 5/2002 | Miller | H03H 7/463 333/129 |

(Continued)

FOREIGN PATENT DOCUMENTS

| | | |
|---|---|---|
| JP | 2001-339273 A | 12/2001 |
| JP | 2015-154434 A | 8/2015 |
| WO | 2005/088833 A1 | 9/2005 |

OTHER PUBLICATIONS

Araki, "Multiplexer, Transmission Apparatus, and Reception Apparatus", U.S. Appl. No. 15/440,539, filed Feb. 23, 2017.

(Continued)

*Primary Examiner* — Parth Patel
(74) *Attorney, Agent, or Firm* — Keating & Bennett, LLP

(57) ABSTRACT

A multiplexer includes a common terminal connected to an inductance element at a connection path with an antenna element, filter elements including different pass bands and connected to the antenna element with the common terminal therebetween, and an inductance element arranged in series between a transmission filter with a largest capacitance when viewed from the antenna side among the filter elements and the common terminal. An inductive component of the inductance element and a capacitive component of the transmission filter element define an LC series resonant circuit, and a resonant frequency of the LC series resonant circuit is lower than any of pass bands of the filter elements.

20 Claims, 23 Drawing Sheets

(56) References Cited

U.S. PATENT DOCUMENTS

| | | | |
|---|---|---|---|
| 6,489,860 B1 | 12/2002 | Ohashi | |
| 6,873,299 B2* | 3/2005 | Dakeya | H01Q 21/30 343/745 |
| 7,038,551 B2* | 5/2006 | Kearns | H03H 9/0038 310/313 D |
| 8,325,632 B2* | 12/2012 | Gorbachov | H04B 1/48 343/835 |
| 8,902,020 B2* | 12/2014 | Bradley | H03H 9/725 333/133 |
| 9,214,920 B2* | 12/2015 | Link | H03H 9/547 |
| 9,917,603 B2* | 3/2018 | Araki | H04B 1/0057 |
| 10,141,913 B2* | 11/2018 | Takamine | H03H 7/38 |
| 2002/0002038 A1* | 1/2002 | Seawright | H01L 27/0207 455/127.1 |
| 2003/0214368 A1* | 11/2003 | Taniguchi | H03H 9/0576 333/133 |
| 2004/0051601 A1* | 3/2004 | Frank | H03H 7/0115 333/187 |
| 2005/0087599 A1* | 4/2005 | Ward | G06K 7/10336 235/451 |
| 2005/0174192 A1* | 8/2005 | Kawamura | H03H 9/564 333/133 |
| 2005/0281210 A1* | 12/2005 | Makino | H03H 7/463 370/275 |
| 2006/0044080 A1* | 3/2006 | Hagiwara | H01P 1/15 333/195 |
| 2007/0190954 A1 | 8/2007 | Murakami et al. | |
| 2008/0224791 A1* | 9/2008 | Cheng | H03H 7/463 333/5 |
| 2010/0203844 A1* | 8/2010 | Gorbachov | H03H 7/38 455/83 |
| 2010/0210299 A1* | 8/2010 | Gorbachov | H04B 1/0057 455/552.1 |
| 2010/0283701 A1* | 11/2010 | Cheng | H01Q 9/285 343/793 |
| 2011/0018653 A1* | 1/2011 | Bradley | H03H 9/706 333/133 |
| 2011/0018654 A1* | 1/2011 | Bradley | H03H 9/706 333/133 |
| 2012/0007785 A1* | 1/2012 | Amari | H01Q 9/0407 343/722 |
| 2012/0139662 A1* | 6/2012 | Fujiwara | H03H 9/02559 333/133 |
| 2014/0015719 A1* | 1/2014 | Ramachandran | H01Q 5/335 343/745 |
| 2014/0133117 A1* | 5/2014 | Saji | H05K 1/0243 361/761 |
| 2014/0375336 A1* | 12/2014 | Gritz | G01R 29/0814 324/647 |
| 2015/0056940 A1* | 2/2015 | Rangarajan | H03F 3/19 455/311 |
| 2016/0112025 A1* | 4/2016 | Nishimura | H03H 7/463 333/132 |
| 2016/0352374 A1* | 12/2016 | Wloczysiak | H04B 1/10 |
| 2017/0026061 A1* | 1/2017 | Wloczysiak | H04B 1/0057 |
| 2017/0083640 A1* | 3/2017 | Turner | G06F 17/505 |
| 2018/0152210 A1* | 5/2018 | Araki | H04B 1/0057 |

OTHER PUBLICATIONS

Official Communication issued in corresponding Japanese Patent Application No. 2016-032662, dated Sep. 10, 2019.

* cited by examiner

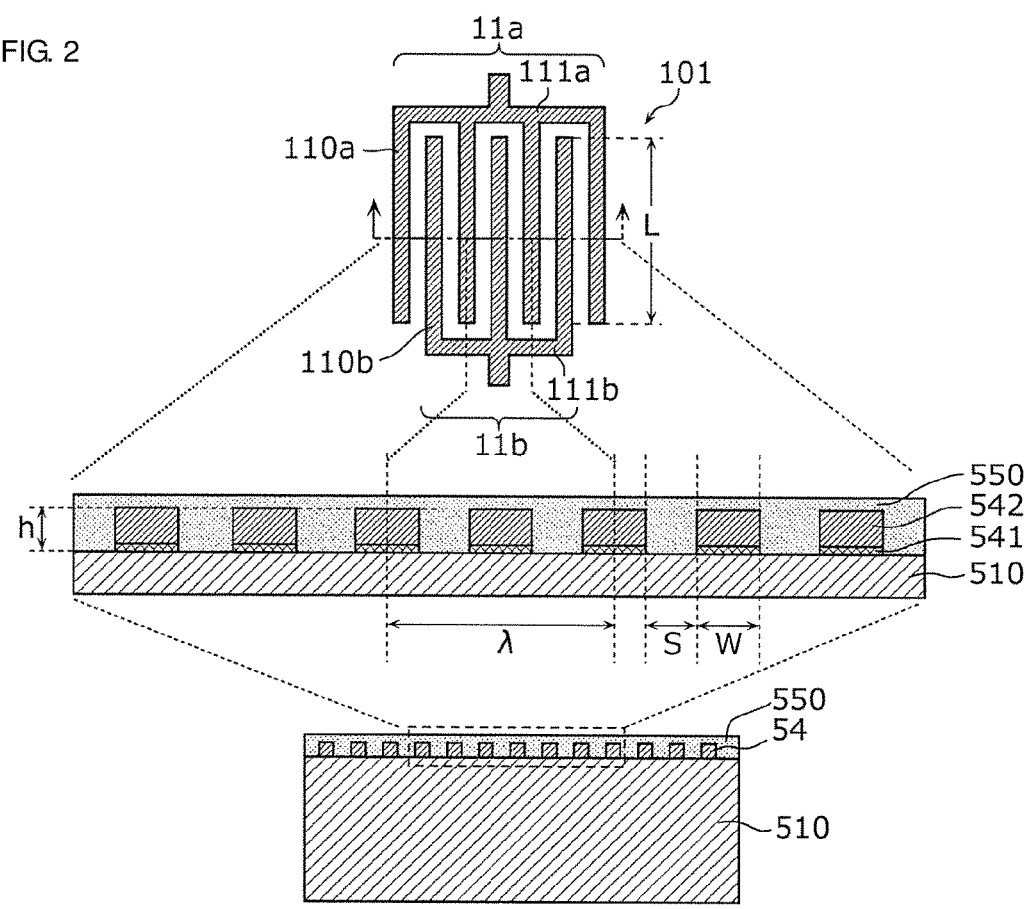

MULTIPLEXER, TRANSMISSION APPARATUS, AND RECEPTION APPARATUS

CROSS REFERENCE TO RELATED APPLICATIONS

This application claims the benefit of priority to Japanese Patent Application No. 2016-032662 filed on Feb. 24, 2016. The entire contents of this application are hereby incorporated herein by reference.

BACKGROUND OF THE INVENTION

1. Field of the Invention

The present invention relates to a multiplexer, a transmission apparatus, and a reception apparatus.

2. Description of the Related Art

In recent years, cellular phones have required that a single terminal support multiple frequency bands and multiple wireless systems, that is, multiband and multimode terminals have been required. To this end, a multiplexer for separating high-frequency signals according to a radio carrier frequency (band) is arranged immediately below an antenna. As a plurality of band pass filters of a multiplexer, elastic wave filters exhibiting low-loss characteristics in a pass band and steepness near the pass band are used.

Japanese Unexamined Patent Application Publication No. 2003-332885 discloses a surface acoustic wave (SAW) demultiplexer in which two ladder SAW filters having different pass bands are connected to a common terminal. In the SAW demultiplexer, an impedance matching circuit including an inductor and a capacitor is arranged between an antenna and the common terminal.

Furthermore, Japanese Unexamined Patent Application Publication No. 2004-104799 discloses a filter in which an acoustic resonator is arranged between a connection node of inductors connected in series and ground. With this arrangement, a notch filter with a high steepness is formed by an LC resonant circuit including the inductor and the capacitance of the acoustic resonator.

For a multiplexer having a small number of bands to be used, impedance matching between an antenna element and each signal path may be achieved by arranging an impedance matching circuit between the antenna element and a common terminal, as with the SAW demultiplexer described in Japanese Unexamined Patent Application Publication No. 2003-332885.

However, as the number of bands to be used increases, it becomes more difficult to achieve impedance matching for a plurality of filter elements using only the above-mentioned impedance matching circuit. Thus, adding, in addition to the above-mentioned impedance matching circuit, matching elements such as an inductor and a capacitor to individual filter elements, has been considered. In this case, however, a notch waveform formed by the LC resonant circuit described in Japanese Unexamined Patent Application Publication No. 2004-104799 may be unexpectedly generated within a pass band of the multiplexer. As a result, it becomes difficult to ensure low-loss characteristics in the pass band of the multiplexer.

SUMMARY OF THE INVENTION

Preferred embodiments of the present invention provide a multiplexer, a transmission apparatus, and a reception apparatus with insertion losses that are significantly reduced or prevented in a pass band of each filter element.

According to a preferred embodiment of the present invention, a multiplexer which transmits and receives high-frequency signals in a plurality of frequency bands via an antenna element includes a common terminal which is connected to an impedance matching element at a connection path with the antenna element; a plurality of filter elements which include different pass bands and which are connected to the antenna element with the common terminal therebetween; and an inductance element which is connected in series between a first filter element with a largest capacitance when viewed from the antenna element side among the plurality of filter elements and the common terminal. A resonant frequency of an LC series resonant circuit is lower than any of pass bands of the plurality of filter elements, and the LC series resonant circuit includes an inductive component of the inductance element and a capacitive component of the first filter element.

In a multiplexer in which a plurality of filter elements are bundled into a common terminal, to provide impedance matching between an antenna element and the plurality of filter elements, an inductance element is arranged in series between one filter element among the plurality of filter elements and the common terminal. Accordingly, an inductive impedance of the one filter element and a capacitive impedance of the other filter elements connected in parallel have a complex conjugate relationship. Therefore, even if the number of filter elements connected in parallel to the antenna element increases, high-precision impedance matching is able to be provided between the antenna element and the plurality of filter elements. Due to LC series resonance generated by the inductance element and the capacitance of the one filter element, a notch may be generated in pass bands of the other filter elements. The notch may define, for example, an attenuation point or attenuation pole. Thus, it is assumed that loss in the pass bands is increased.

Accordingly, in particular, loss in a low frequency end of the pass band of the multiplexer may be decreased by setting the resonant frequency of the LC series resonant circuit including the inductance element and the first filter element connected to the inductance element to a frequency range lower than the pass band of the multiplexer.

According to a preferred embodiment of the present invention, a multiplexer which transmits and receives high-frequency signals in a plurality of frequency bands via an antenna element, further includes a second inductance element or a capacitance element which is arranged in series or in parallel between the inductance element and the first filter element with the largest capacitance. When the second inductance element or the capacitance element is arranged in parallel between the inductance element and the first filter element with the largest capacitance, the second inductance element or the capacitance element is connected to a reference terminal on a first side and to a connection point of the inductance element and the first filter element on a second side. A resonant frequency of an LC series resonant circuit is lower than any of pass bands of the plurality of filter elements, the LC series resonant circuit including an inductive component of the inductance element, a capacitive component of the first filter element with the largest capacitance, and an inductive component of the second inductance element or a capacitive component of the capacitance element.

Furthermore, according to a preferred embodiment of the present invention, a multiplexer which transmits and receives high-frequency signals in a plurality of frequency bands via an antenna element, includes a common terminal which is connected to an impedance matching element at a connection path with the antenna element; a plurality of filter elements which include different pass bands and which are connected to the antenna element with the common terminal therebetween; and an inductance element which is arranged in series between a second filter element with a smallest capacitance when viewed from the antenna element side among the plurality of filter elements and the common terminal. A resonant frequency of an LC series resonant circuit is higher than any of pass bands of the plurality of filter elements, the LC series resonant circuit including an inductive component of the inductance element and a capacitive component of the second filter element.

Accordingly, in particular, loss in a high frequency end of the pass band of the multiplexer may be decreased by setting the resonant frequency of the LC series resonant circuit including the inductance element and the second filter element connected to the inductance element to a frequency range higher than the pass band of the multiplexer.

According to a preferred embodiment of the present invention, a multiplexer which transmits and receives high-frequency signals in a plurality of frequency bands via an antenna element, further includes a second inductance element or a capacitance element which is arranged in series or in parallel between the inductance element and the second filter element with the smallest capacitance. When the second inductance element or the capacitance element is arranged in parallel between the inductance element and the second filter element with the smallest capacitance, the second inductance element or the capacitance element is connected to a reference terminal on a first side and to a connection point of the inductance element and the second filter element with the smallest capacitance on a second side. A resonant frequency of an LC series resonant circuit is higher than any of pass bands of the plurality of filter elements, the LC series resonant circuit including an inductive component of the inductance element, a capacitive component of the second filter element with the smallest capacitance, and an inductive component of the second inductance element or a capacitive component of the capacitance element.

Furthermore, the multiplexer may transmit and receive high-frequency signals in five or more frequency bands, and the plurality of filter elements may include five or more filter elements.

For a multiplexer, such as a triplexer or a dual duplexer, including four or less frequency bands, impedance matching between the antenna element and the plurality of filter elements may be comprehensively provided by an impedance matching circuit arranged between the antenna element and the common terminal. In contrast, for a multiplexer including five or more frequency bands, the combined impedance of the five or more filter elements connected in parallel is extremely capacitive. Therefore, it is difficult to provide impedance matching between the antenna element and each of the plurality of filter elements using only the impedance matching element arranged between the antenna element and the common terminal.

Accordingly, even if the number of bands increases and the pass band of the multiplexer becomes wider, the resonant frequency of the LC series resonant circuit including the inductance element and the filter element is set to a frequency range lower (or higher) than the pass band of the multiplexer. Therefore, in particular, loss in a low frequency end (or high frequency end) of the pass band of the multiplexer may be decreased.

Furthermore, each of the plurality of filter elements may be an elastic surface acoustic wave filter or an elastic wave filter.

Elastic wave filters tend to include a capacitive impedance. Therefore, an impedance matching approach preferably includes arranging an inductance element in series between one filter element among the plurality of filter elements and the common terminal and providing a complex conjugate relationship between the inductive impedance of the one filter element and the capacitive impedance of the other filter elements connected in parallel.

Furthermore, at least one of the plurality of filter elements may include a series resonator which is arranged in series between the common terminal and a first terminal and a parallel resonator which is arranged between a connection path from the common terminal to the first terminal and a reference terminal.

In particular, the impedance of an elastic wave filter including a ladder structure is capacitive. Therefore, an impedance matching approach preferably includes arranging an inductance element in series between one filter element among the plurality of filter elements and the common terminal and providing a complex conjugate relationship between the inductive impedance of the one filter element and the capacitive impedance of the other filter elements connected in parallel.

Furthermore, the multiplexer may further include the impedance matching element.

Accordingly, an antenna front-end unit with low-loss characteristics may be provided simply by connecting the antenna element to the multiplexer. Therefore, circuit implementation may be easily provided.

Furthermore, according to a preferred embodiment of the present invention, a transmission apparatus which transmits high-frequency signals in a plurality of frequency bands via an antenna element, includes a common terminal which is connected to an impedance matching element at a connection path with the antenna element; a plurality of transmission filter elements which include different pass bands and which are connected to the antenna element with the common terminal therebetween; and an inductance element which is arranged in series between a first filter element with a largest capacitance when viewed from the antenna element side among the plurality of transmission filter elements and the common terminal. A resonant frequency of an LC series resonant circuit is lower than any of pass bands of the plurality of transmission filter elements, the LC series resonant circuit including an inductive component of the inductance element and a capacitive component of the first filter element.

According to a preferred embodiment of the present invention, a transmission apparatus which transmits high-frequency signals in a plurality of frequency bands via an antenna element, further includes a second inductance element or a capacitance element which is arranged in series or in parallel between the inductance element and the first filter element with the largest capacitance. When the second inductance element or the capacitance element is arranged in parallel between the inductance element and the first filter element with the largest capacitance, the second inductance element or the capacitance element is connected to a reference terminal on a first side and to a connection point of the inductance element and the first filter element on a second side. A resonant frequency of an LC series resonant circuit is lower than any of pass bands of the plurality of transmission filter elements, the LC series resonant circuit including an inductive component of the inductance element, a capacitive component of the first filter element with the largest capacitance, and an inductive component of the second inductance element or a capacitive component of the capacitance element.

Furthermore, according to a preferred embodiment of the present invention, a transmission apparatus which transmits high-frequency signals in a plurality of frequency bands via an antenna element, includes a common terminal which is connected to an impedance matching element at a connection path with the antenna element; a plurality of transmission filter elements which include different pass bands and which are connected to the antenna element with the common terminal therebetween; and an inductance element which is arranged in series between a second filter element with a smallest capacitance when viewed from the antenna element side among the plurality of transmission filter elements and the common terminal. A resonant frequency of an LC series resonant circuit is higher than any of pass bands of the plurality of transmission filter elements, the LC series resonant circuit including an inductive component of the inductance element and a capacitive component of the second filter element.

According to a preferred embodiment of the present invention, a transmission apparatus which transmits high-frequency signals in a plurality of frequency bands via an antenna element, further includes a second inductance element or a capacitance element which is arranged in series or in parallel between the inductance element and the second filter element with the smallest capacitance. When the second inductance element or the capacitance element is arranged in parallel between the inductance element and the second filter element with the smallest capacitance, the second inductance element or the capacitance element is connected to a reference terminal on a first side and to a connection point of the inductance element and the second filter element with the smallest capacitance on a second side. A resonant frequency of an LC series resonant circuit is higher than any of pass bands of the plurality of transmission filter elements, the LC series resonant circuit including an inductive component of the inductance element, a capacitive component of the second filter element with the smallest capacitance, and an inductive component of the second inductance element or a capacitive component of the capacitance element.

According to a preferred embodiment of the present invention, a reception apparatus which receives high-frequency signals in a plurality of frequency bands via an antenna element, includes a common terminal which is connected to an impedance matching element at a connection path with the antenna element; a plurality of reception filter elements which include different pass bands and which are connected to the antenna element with the common terminal therebetween; and an inductance element which is arranged in series between a first filter element with a largest capacitance when viewed from the antenna element side among the plurality of reception filter elements and the common terminal. A resonant frequency of an LC series resonant circuit is lower than any of pass bands of the plurality of reception filter elements, the LC series resonant circuit including an inductive component of the inductance element and a capacitive component of the first filter element.

According to a preferred embodiment of the present invention, a reception apparatus which receives high-frequency signals in a plurality of frequency bands via an antenna element, further includes a second inductance element or a capacitance element which is arranged in series or in parallel between the inductance element and the first filter element with the largest capacitance. When the second inductance element or the capacitance element is arranged in parallel between the inductance element and the first filter element with the largest capacitance, the second inductance element or the capacitance element is connected to a reference terminal on a first side and to a connection point of the inductance element and the first filter element on a second side. A resonant frequency of an LC series resonant circuit is lower than any of pass bands of the plurality of reception filter elements, the LC series resonant circuit including an inductive component of the inductance element, a capacitive component of the first filter element with the largest capacitance, and an inductive component of the second inductance element or a capacitive component of the capacitance element.

According to a preferred embodiment of the present invention, a reception apparatus which receives high-frequency signals in a plurality of frequency bands via an antenna element, includes a common terminal which is connected to an impedance matching element at a connection path with the antenna element; a plurality of reception filter elements which include different pass bands and which are connected to the antenna element with the common terminal therebetween; and an inductance element which is arranged in series between a second filter element with a smallest capacitance when viewed from the antenna element side among the plurality of reception filter elements and the common terminal. A resonant frequency of an LC series resonant circuit is higher than any of pass bands of the plurality of reception filter elements, the LC series resonant circuit including an inductive component of the inductance element and a capacitive component of the second filter element.

According to a preferred embodiment of the present invention, a reception apparatus which receives high-frequency signals in a plurality of frequency bands via an antenna element, further includes a second inductance element or a capacitance element which is arranged in series or in parallel between the inductance element and the second filter element with the smallest capacitance. When the second inductance element or the capacitance element is arranged in parallel between the inductance element and the second filter element with the smallest capacitance, the second inductance element or the capacitance element is connected to a reference terminal on a first side and to a connection point of the inductance element and the second filter element with the smallest capacitance on a second side. A resonant frequency of an LC series resonant circuit is higher than any of pass bands of the plurality of reception filter elements, the LC series resonant circuit including an inductive component of the inductance element, a capacitive component of the second filter element with the smallest capacitance, and an inductive component of the second inductance element or a capacitive component of the capacitance element.

With a multiplexer, a transmission apparatus, and a reception apparatus according to preferred embodiments of the present invention, even if the number of bands to be supported increases, insertion losses in a pass band of each filter element may be significantly reduced or prevented.

The above and other elements, features, steps, characteristics and advantages of the preferred embodiments of the present invention will become more apparent from the following detailed description of the preferred embodiments with reference to the attached drawings.

BRIEF DESCRIPTION OF THE DRAWINGS

FIG. 2 includes a plan view and a cross-sectional view schematically showing a resonator of an elastic surface acoustic wave filter according to the first preferred embodiment of the present invention.

DETAILED DESCRIPTION OF THE PREFERRED EMBODIMENTS

Figure 1:
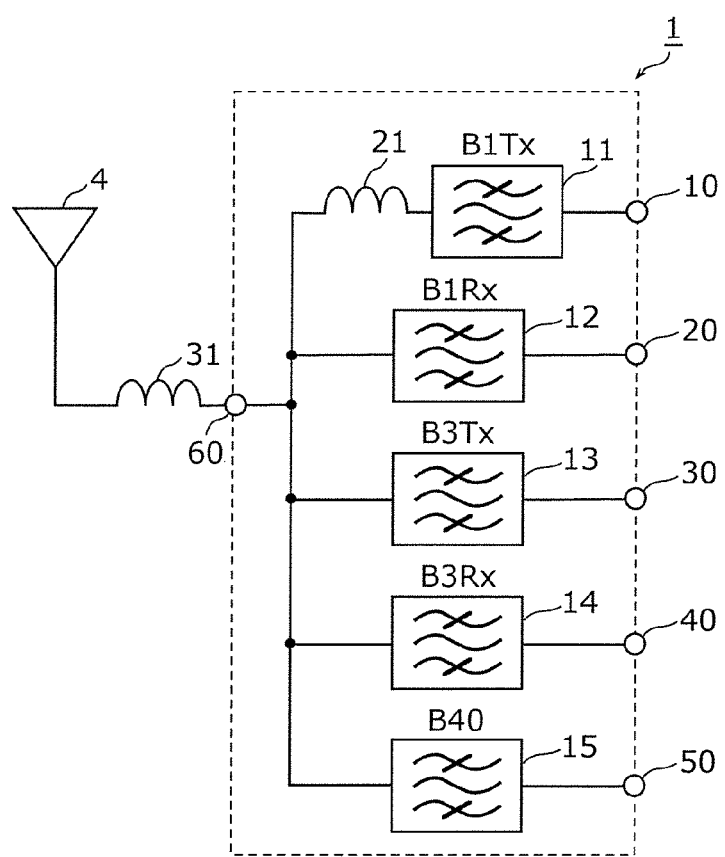
FIG. 1 is a circuit diagram of a multiplexer according to a first preferred embodiment of the present invention.

Hereinafter, preferred embodiments of the present invention will be described in detail with reference to drawings. Each of the preferred embodiments described below illustrates a comprehensive or specific example. The numerical values, shapes, materials, components, arrangement and connections of the components, and the like illustrated in the preferred embodiments described below are merely examples, and are not intended to limit the present invention. Any component in the preferred embodiments described below which is not described in an independent claim will be described as an arbitrary component. Furthermore, sizes of components illustrated in the drawings or the ratio of sizes of the components is not necessarily exact. It is to be noted that the preferred embodiments described in this specification are merely examples, and that the configurations in the preferred embodiments are able to be partly replaced or combined between different preferred embodiments.

In a preferred embodiment of the present invention, a pentaplexer for Band 1 (transmission pass band: from about 1920 MHz to about 1980 MHz, reception pass band: from about 2110 MHz to about 2170 MHz), Band 3 (transmission pass band: from about 1710 MHz to about 1785 MHz, reception pass band: from about 1805 MHz to about 1880 MHz), and Band 40 (pass band: from about 2300 MHz to about 2400 MHz) of time division long term evolution (TD-LTE) standards is described below.

A multiplexer 1 according to a preferred embodiment of the present invention preferably is a pentaplexer including a Band 1 duplexer, a Band 3 duplexer, and a Band 40 filter which are bundled into a common terminal 60.

First Preferred Embodiment

FIG. 1 is a circuit diagram of the multiplexer 1 according to a first preferred embodiment of the present invention. As shown in FIG. 1, the multiplexer 1 includes transmission filters 11 and 13, reception filters 12 and 14, a transmission and reception filter 15, an inductance element 21, a common terminal 60, transmission input terminals 10 and 30, reception output terminals 20 and 40, and an input and output terminal 50. The multiplexer 1 is connected to an antenna element 4 with an inductance element 31 therebetween, the inductance element 31 being connected in series to the common terminal 60 and the antenna element 4. The inductance element 31 defines and functions as an impedance matching element.

The transmission filter 11 is a band pass filter which inputs a transmission signal generated at a transmission circuit (for example, an RFIC or the like) via the transmission input terminal 10, performs filtering with the transmission pass band (for example, from about 1920 MHz to about 1980 MHz) for Band 1, and outputs the signal to the common terminal 60. Furthermore, the inductance element 21 is connected in series between the transmission filter 11 and the common terminal 60. Preferably, the transmission filter 11 is an unbalanced input-unbalanced output filter.

The reception filter 12 is a band pass filter which inputs a reception signal input from the common terminal 60, performs filtering with a reception pass band (for example, from about 2110 MHz to about 2170 MHz) for Band 1, and outputs the signal to the reception output terminal 20. Preferably, the reception filter 12 is an unbalanced input-unbalanced output filter.

The transmission filter 13 is a band pass filter which inputs a transmission signal generated at a transmission circuit (for example, an RFIC or the like) via the transmission input terminal 30, performs filtering with a transmission pass band (for example, from about 1710 MHz to about 1785 MHz) for Band 3, and outputs the signal to the common terminal 60. Preferably, the transmission filter 13 is an unbalanced input-unbalanced output filter.

The reception filter 14 is a band pass filter which inputs a reception signal input from the common terminal 60, performs filtering with a reception pass band (for example, from about 1805 MHz to about 1880 MHz) for Band 3, and outputs the signal to the reception output terminal 40. Preferably, the reception filter 14 is an unbalanced input-unbalanced output filter.

The transmission and reception filter 15 is a band pass filter which inputs a reception signal input from the common terminal 60, inputs a transmission signal generated at a transmission circuit (for example, an RFIC or the like) via the transmission input terminal 10, performs filtering with a pass band (for example, from about 2300 MHz to about 2400 MHz) for Band 40, and outputs the signal to the reception output terminal 40 or the common terminal 60. Preferably, the transmission and reception filter 15 is an unbalanced input-unbalanced output filter.

The transmission filter 13, the reception filters 12 and 14, and the transmission and reception filter 15 are connected directly to the common terminal 60.

In the present preferred embodiment, the transmission filters 11 and 13, the reception filters 12 and 14, and the transmission and reception filter 15 preferably are elastic surface acoustic wave filters.

Elastic surface acoustic wave resonators of the transmission filters 11 and 13, the reception filters 12 and 14, and the transmission and reception filter 15 are described below.

FIG. 2 is an example of a plan view and a cross-sectional view schematically showing a resonator of an elastic surface acoustic wave filter according to a preferred embodiment of the present invention. More specifically, FIG. 2 shows a plan schematic view and a cross-sectional schematic view of a structure of a series resonator 101 of the transmission filter 11 among a plurality of resonators of the five filters described above are exemplified. The series resonator shown in FIG. 2 is provided to explain one example of a structure of the plurality of resonators, and the number and length of electrode fingers of an electrode are not limited to the particular structure and arrangement shown in FIG. 2.

Each of the resonators of the five filters described above includes a piezoelectric substrate 510 and interdigital transducer (IDT) electrodes 11a and 11b having a comb shape or substantially a comb shape.

As shown in the plan view of FIG. 2, the pair of IDT electrodes 11a and 11b facing each other is provided on the piezoelectric substrate 510. The IDT electrode 11a includes a plurality of electrode fingers 110a which are parallel or substantially parallel to each other and a busbar electrode 111a connecting the plurality of electrode fingers 110a. Furthermore, the IDT electrode 11b includes a plurality of electrode fingers 110b which are parallel or substantially parallel to each other and a busbar electrode 111b connecting the plurality of electrode fingers 110b.

An IDT electrode 54, which includes the plurality of electrode fingers 110a and 110b and the busbar electrodes 111a and 111b, includes a multilayer body structure including a close contact layer 541 and a main electrode layer 542, as shown in the cross-sectional view of FIG. 2.

The close contact layer 541 is a layer that provides close contact between the piezoelectric substrate 510 and the main electrode layer 542. The close contact layer 541 includes, for example, Ti. The film thickness of the close contact layer 541 preferably is, for example, about 12 nm.

The main electrode layer 542 preferably includes, for example, Al with about 1% of Cu. The film thickness of the main electrode layer 542 preferably is, for example, about 162 nm.

A protection layer 550 covers the IDT electrodes 11a and 11b. The protection layer 550 is a layer that protects the main electrode layer 542 from an external environment, adjusts the frequency-temperature characteristics, increases the moisture resistance, and the like. As a main component, the protection layer 550 includes, for example, silicon dioxide.

Materials included in the close contact layer 541, the main electrode layer 542, and the protection layer 550 are not limited to the materials described above. Furthermore, the IDT electrode 54 does not need to have the multilayer body structure. The IDT electrode 54 may include, for example, a metal such as Ti, Al, Cu, Pt, Au, Ag, or Pd or an alloy of the one or more of these metals or may include a plurality of multilayer bodies including one or more of the above metals or alloy thereof. The protection layer 550 may be omitted.

The piezoelectric substrate 510 includes, for example, lithium tantalate single crystal which is cut at a predetermined cut angle or ceramics through which elastic surface acoustic waves pass in a predetermined direction.

Preferred design elements and features of an IDT electrode are described below. The wavelength of an elastic surface acoustic wave resonator is defined by a repetition pitch λ of the plurality of electrode fingers 110a and 110b of the IDT electrodes 11a and 11b, which is shown in a middle portion of FIG. 2. Furthermore, the cross width L of an IDT electrode represents the electrode finger length of overlapping portions of the electrode finger 110a of the IDT electrode 11a and the electrode fingers 110b of the IDT electrode 11b, as shown in an upper portion of FIG. 2. Furthermore, the number of pairs represents the number of the electrode fingers 110a or 110b.

The structure of each elastic surface acoustic wave filter of the multiplexer 1 according to the present invention is not limited to the structure shown in FIG. 2. For example, the IDT electrode 54 may include a single layer of a metal film, instead of including a multilayer body structure of metal films.

Figure 3A:
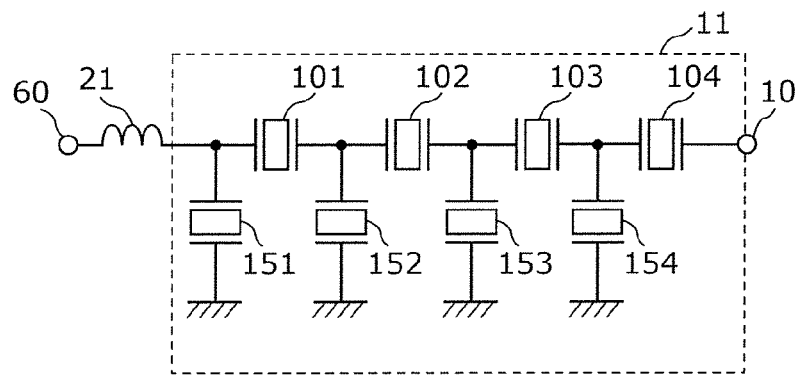
FIG. 3A is a circuit diagram of a transmission filter for Band 1 according to the first preferred embodiment of the present invention.

FIG. 3A is a circuit diagram of the transmission filter 11 for Band 1 according to a preferred embodiment of the present invention. As shown in FIG. 3A, the transmission filter 11 includes series resonators 101 to 104 and parallel resonators 151 to 154. Furthermore, the inductance element 21 that provides impedance matching is connected in series between the transmission filter 11 and the common terminal 60.

The series resonators 101 to 104 are connected in series to each other between the transmission input terminal 10 and the common terminal 60. Furthermore, the parallel resonators 151 to 154 are connected in parallel to each other between corresponding reference terminals (for example, ground) and corresponding connection points of the transmission input terminal 10, the series resonators 101 to 104, and the inductance element 21. With the connections of the series resonators 101 to 104 and the parallel resonators 151 to 154, the transmission filter 11 defines and functions as a ladder band pass filter.

Figure 3B:
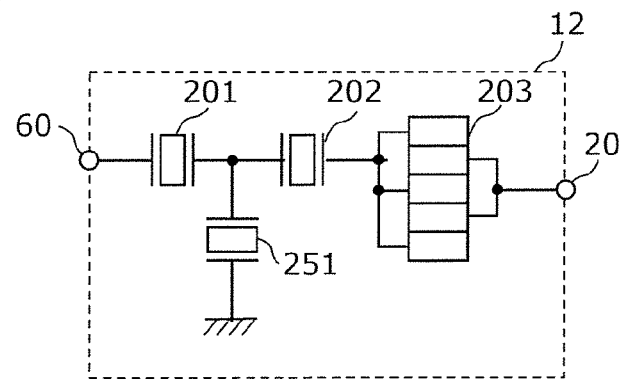
FIG. 3B is a circuit diagram of a reception filter for Band 1 according to the first preferred embodiment of the present invention.
Figure 3C:
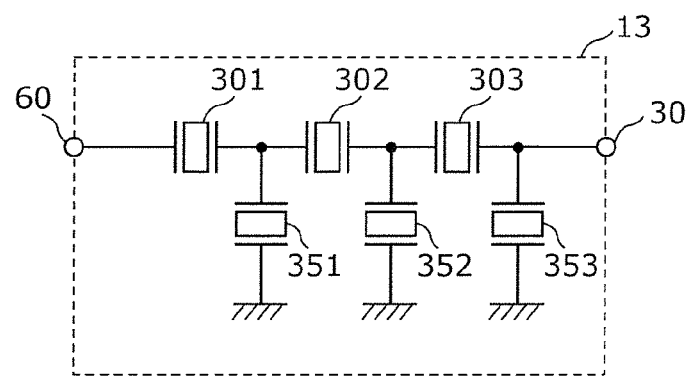
FIG. 3C is a circuit diagram of a transmission filter for Band 3 according to the first preferred embodiment of the present invention.

FIG. 3C is a circuit diagram of the transmission filter 13 for Band 3 according to a preferred embodiment of the present invention. As shown in FIG. 3C, the transmission filter 13 includes series resonators 301 to 303 and parallel resonators 351 to 353.

The series resonators 301 to 303 are connected in series to each other between the transmission input terminal 30 and the common terminal 60. Furthermore, the parallel resonators 351 to 353 are connected in parallel to each other between corresponding reference terminals (for example, ground) and corresponding connection points of the transmission input terminal 30, the series resonators 301 to 303, and the common terminal 60. With the connections of the series resonators 301 to 303 and the parallel resonators 351 to 353, the transmission filter 13 defines and functions as a ladder band pass filter.

Figure 3D:
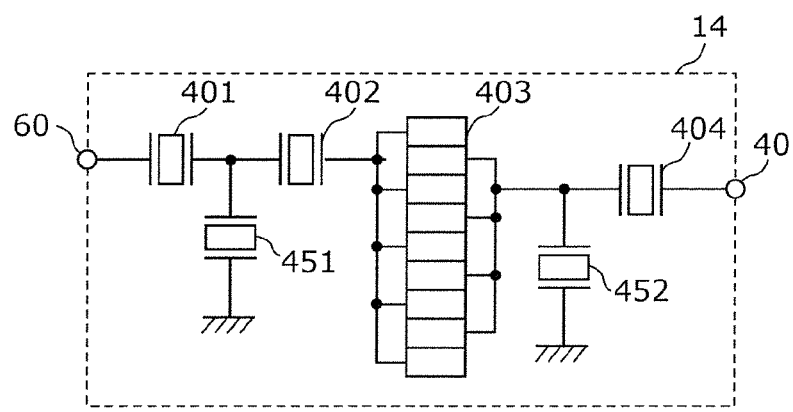
FIG. 3D is a circuit diagram of a reception filter for Band 3 according to the first preferred embodiment of the present invention.
Figure 3E:
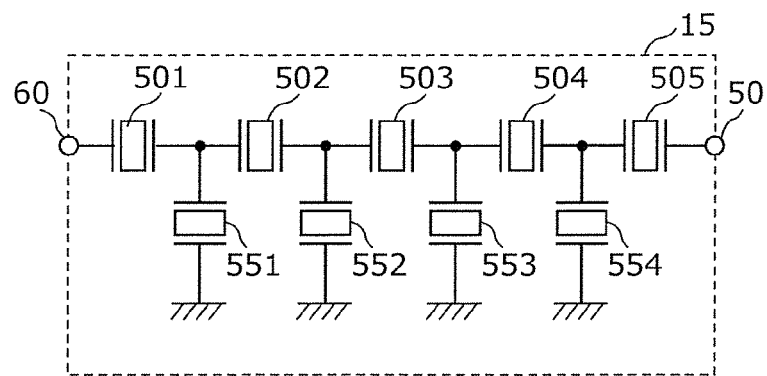
FIG. 3E is a circuit diagram of a transmission and reception filter for Band 40 according to the first preferred embodiment of the present invention.

FIG. 3E is a circuit diagram of the transmission and reception filter 15 for Band 40 according to a preferred embodiment of the present invention. As shown in FIG. 3E, the transmission and reception filter 15 includes series resonators 501 to 505 and parallel resonators 551 to 554.

The series resonators 501 to 505 are connected in series to each other between the input and output terminal 50 and the common terminal 60. Furthermore, the parallel resonators 551 to 554 are connected in parallel to each other between corresponding reference terminals (for example, ground) and corresponding connection points of the input and output terminal 50, the series resonators 501 to 505 and the common terminal 60. With the connections of the series resonators 501 to 505 and the parallel resonators 551 to 554, the transmission and reception filter 15 defines and functions as a ladder band pass filter.

FIG. 3B is a circuit diagram of the reception filter 12 for Band 1 according to a preferred embodiment of the present invention. As shown in FIG. 3B, the reception filter 12 includes a longitudinally-coupled elastic surface acoustic wave filter. More specifically, the reception filter 12 includes a longitudinally-coupled filter 203, series resonators 201 and 202, and a parallel resonator 251. The series resonators 201 and 202 and the parallel resonator 251 define a ladder filter.

FIG. 3D is a circuit diagram of the reception filter 14 for Band 3 according to a preferred embodiment of the present invention. As shown in FIG. 3D, the reception filter 14 includes a longitudinally-coupled elastic surface acoustic wave filter. More specifically, the reception filter 14 includes a longitudinally-coupled filter 403, series resonators 401, 402, and 404, and parallel resonators 451 and 452. The series resonators 401, 402, and 404 and the parallel resonators 451 and 452 define a ladder filter.

Figure 4:
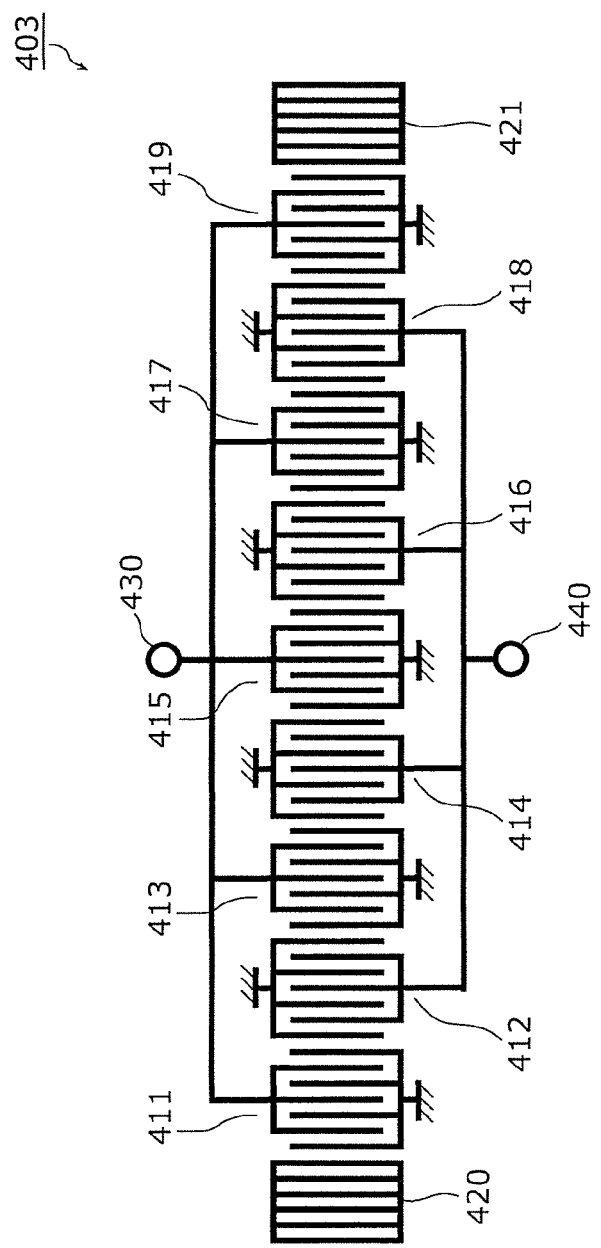
FIG. 4 is a schematic plan view showing electrodes of a longitudinally-coupled elastic surface acoustic wave filter according to the first preferred embodiment of the present invention.

FIG. 4 is a schematic plan view showing electrodes of the longitudinally-coupled filter 403 according to a preferred embodiment of the present invention. As shown in FIG. 4, the longitudinally-coupled filter 403 includes IDTs 411 to 419, reflectors 420 and 421, an input port 430, and an output port 440.

The IDTs 411 to 419 each include a pair of IDT electrodes facing each other. The IDTs 414 and 416 sandwich the IDT 415 therebetween, and the IDTs 413 and 417 sandwich the IDTs 414 to 416 therebetween. Furthermore, the IDTs 412 and 418 sandwich the IDTs 413 to 417 therebetween, and the IDTs 411 and 419 sandwich the IDTs 412 to 418 therebetween. The reflectors 420 and 421 sandwich the IDTs 411 to 419 therebetween. Furthermore, the IDTs 411, 413, 415, 417, and 419 are connected in parallel between the input port 430 and reference terminals (for example, ground), and the IDTs 412, 414, 416, and 418 are connected in parallel between the output port 440 and reference terminals.

The arrangement and features of the electrodes of the longitudinally-coupled filter 203 is similar to the electrodes of the longitudinally-coupled filter 403 of the reception filter 14 with the exception of the number of included IDTs. Therefore, explanation of the electrodes of the longitudinally-coupled filter 203 is omitted.

The arrangement and configuration of resonators and circuit elements in elastic surface acoustic wave filters provided in the multiplexer 1 according to the present preferred embodiment is not limited to the arrangement and configuration of the transmission filters 11 and 13, the reception filters 12 and 14, and the transmission and reception filter 15. The arrangement and configuration of the resonators and the circuit elements of the elastic surface acoustic wave filters varies according to specifications of bandpass characteristics in individual frequency bands. The arrangement and configuration described above represents, for example, the number of series resonators and parallel resonators included, and selection of filter features, such as a ladder filter or a longitudinally-coupled filter.

Furthermore, an inductance element that provides an attenuation pole may be inserted between a parallel resonator and a reference terminal. Furthermore, reference terminals to which parallel resonators are connected may be shared or isolated.

Principal features of the multiplexer 1 according to the present preferred embodiment include: (1) the inductance element 21 is arranged in series between the transmission filter 11 with the largest capacitance when viewed from the antenna element 4 side among the five filters described above and the common terminal 60, and (2) the resonant frequency of the LC series resonant circuit which includes an inductive component of the inductance element 21 and a capacitive component of the transmission filter 11 is lower than any of pass bands of the five filter elements.

With the multiplexer 1 including the features described above, even if the number of bands to be supported increases, insertion loss in pass bands of individual filters that define the bands may be significantly reduced or prevented.

With respect to a multiplexer with a small number of bands, that is, a multiplexer with a small number of signal paths to be bundled into an antenna element, impedance matching between the antenna element 4 and the individual signal paths may be provided by arranging an impedance matching circuit including an inductor and a capacitor between the antenna element 4 and the common terminal 60.

However, as the number of bands increases, it becomes more difficult to provide impedance matching for a plurality of filter elements only with the impedance matching circuit arranged between the antenna element 4 and the common terminal 60.

Thus, in addition to the impedance matching circuit described above, a matching element such as an inductor and a capacitor to each filter element may be added.

For example, in the case where capacitive impedance characteristics are provided, as with the five SAW filter elements according to the preferred embodiment described above, an inductance element is arranged in series between one filter element and the common terminal 60. Accordingly, a complex conjugate relationship is provided between the inductive impedance of the one filter element when viewed from the antenna element 4 side and the capacitive impedance of the other filter elements connected in parallel to the common terminal 60. Therefore, even in the case where the number of filter elements connected in parallel to the antenna element increases and the capacitance of the combined impedance of the other filter elements connected in parallel to the common terminal 60 increases, high-precision impedance matching is able to be provided between the antenna element and the plurality of filter elements. The individual filter elements of the multiplexer 1 according to the preferred embodiment described above include a ladder structure which includes series resonators and parallel resonators. In particular, the impedance of an elastic wave filter including the ladder structure is capacitive. Therefore, an impedance matching approach preferably includes arranging an inductance element in series between one filter element among a plurality of filter elements and a common terminal and providing a complex conjugate relationship between the inductive impedance of the one filter element and the capacitive impedance of the other filter elements connected in parallel.

However, the arrangement of the inductance element in series between the one filter element and the common terminal has a problem as described below.

Figure 5:
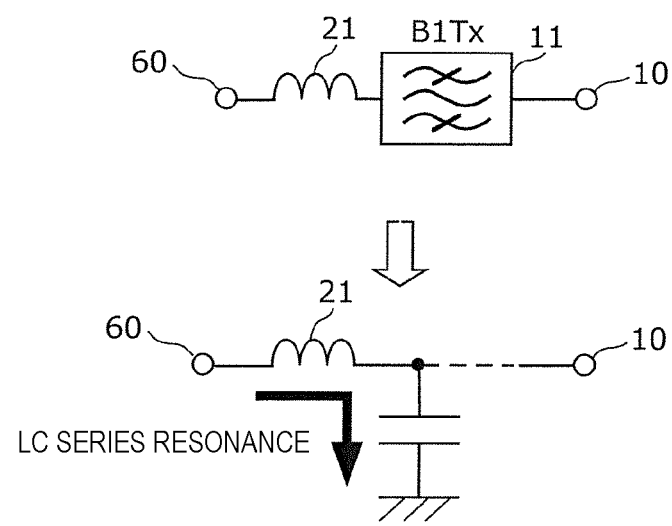
FIG. 5 is a diagram showing an LC series resonant circuit including an inductor element and a filter element according to the first preferred embodiment of the present invention.

FIG. 5 is a diagram showing an LC series resonant circuit including an inductor element and a filter element according to a preferred embodiment of the present invention. As shown in FIG. 5, for example, in the case where the inductance element 21 is connected in series between the transmission filter 11 and the common terminal 60, LC series resonance is generated at a path from the common terminal 60 to a reference terminal (for example, ground) by an inductive component (L) of the inductance element 21 and a capacitive component (C) of the transmission filter 11. The resonant frequency fr of the LC series resonance is represented by Equation 1.

$$fr = \frac{1}{2\pi\sqrt{LC}}$$

Individual filter elements of a multiplexer are connected with the common terminal 60. Therefore, according to the configuration and arrangement of the multiplexer, a notch filter including the resonant frequency fr is added to the individual filter elements. In this case, if the resonant frequency fr is present in a pass band of the individual filter elements, insertion loss within the pass band is increased by the notch.

As the number of frequency bands used in a multiplexer increases, the width of the pass band of the multiplexer, which is determined by combining pass bands of individual frequency bands, increases. As the width of the pass band of the multiplexer increases, a concern that the resonant frequency fr of the LC series resonance is present in the pass band increases. Thus, loss in the pass band of the multiplexer increases.

The multiplexer 1 according to the present preferred embodiment significantly reduces or prevents loss in the pass band of the multiplexer 1 by providing a notch, which is generated by the LC series resonance of the inductance element 21 and the transmission filter 11 with the largest capacitance when viewed from the antenna element 4 side, to be generated in a frequency range lower than the pass band of the multiplexer 1.

Operational features provided by the multiplexer 1 are described below.

In the multiplexer 1 according to the preferred embodiment described above, the inductance element 21 is connected in series between the common terminal 60 and the transmission filter 11 with the largest capacitance when viewed from the antenna element 4 side among the plurality of filter elements bundled into the common terminal 60. For comparison among the capacitances of the plurality of filter elements bundled into the common terminal 60, a method for calculating the capacitances of the individual filter elements is described below.

Figure 6:
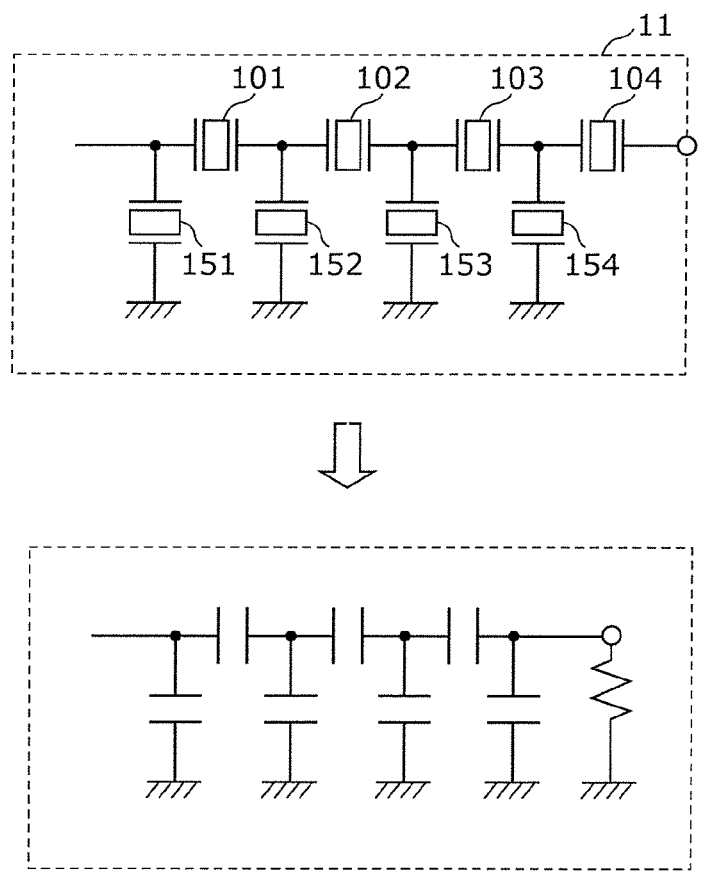
FIG. 6 is a capacitance equivalent circuit diagram of a transmission filter for Band 1 according to the first preferred embodiment of the present invention.

FIG. 6 is a capacitance equivalent circuit diagram of the transmission filter 11 according to a preferred embodiment of the present invention. In FIG. 6, a circuit of the transmission filter 11 for Band 11 (upper portion of FIG. 6) and an equivalent circuit for a case where a resonator is regarded as a capacitance (lower portion of FIG. 6) are shown. Filter elements in the preferred embodiment shown in FIG. 6 include elastic surface acoustic wave resonators. Therefore, the resonators may function as or be defined by capacitances.

As with the transmission filter 11 shown in FIG. 6, capacitance equivalent circuits may be set for the transmission filter 13, the reception filters 12 and 14, and the transmission and reception filter 15. Based on the capacitance equivalent circuits set as described above, capacitances of individual filter elements when viewed from the antenna element 4 side may be calculated.

Table 1 shows calculation results of equivalent capacitances of the transmission filters 11 and 13, the reception filters 12 and 14, and the transmission and reception filter 15.

TABLE 1

| | Filter capacitance (pF) when viewed from antenna element 4 side |
|---|---|
| Band 1 Transmission filter 11 | 2.050 |
| Band 1 Reception filter 12 | 0.575 |
| Band 3 Transmission filter 13 | 0.875 |
| Band 3 Reception filter 14 | 0.525 |
| Band 40 Transmission and reception filter 15 | 0.925 |

As shown in Table 1, the transmission filter 11 provides the largest filter capacitance when viewed from the antenna element 4 side. Based on this, the inductance element 21 is connected in series between the common terminal 60 and the transmission filter 11.

Based on Equation 1, the resonant frequency fr of a notch decreases as the filter capacitance increases. Therefore, by connecting the inductance element 21 in series to the filter element with the largest filter capacitance, the resonant frequency fr of the notch may be generated in a lowest frequency range. Thus, the notch may be generated in a frequency range lower than the pass band of the multiplexer 1.

Figure 7A:
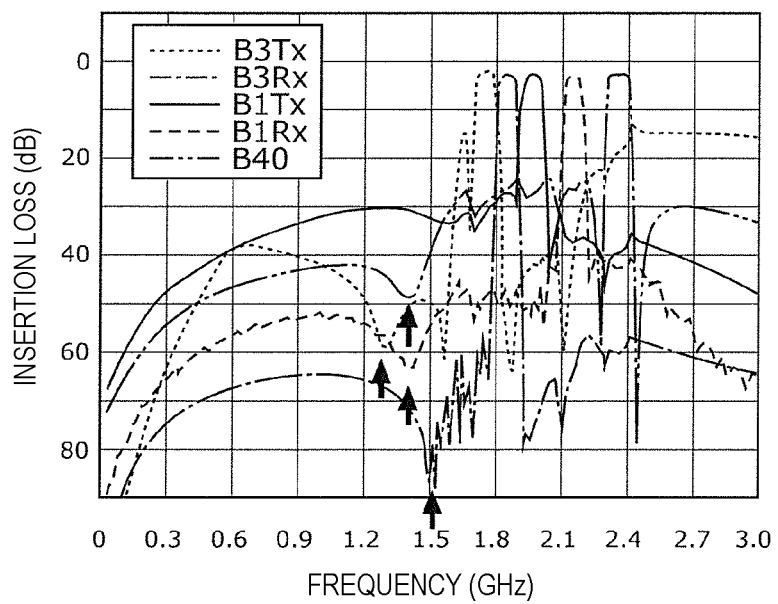
FIG. 7A is a graph showing bandpass characteristics of a multiplexer according to the first preferred embodiment of the present invention.

FIG. 7A is a graph showing bandpass characteristics of the multiplexer 1 according to a preferred embodiment of the present invention. More specifically, FIG. 7A shows bandpass characteristics of the transmission filter 11 for Band 1 provided between the common terminal 60 and the transmission input terminal 10 (solid line), bandpass characteristics of the reception filter 12 for Band 1 provided between the common terminal 60 and the reception output terminal 20 (rough broken like), bandpass characteristics of the transmission filter 13 for Band 3 provided between the common terminal 60 and the transmission input terminal 30 (fine broken line), bandpass characteristics of the reception filter 14 for Band 3 provided between the common terminal 60 and the reception output terminal 40 (one-dotted line), and bandpass characteristics of the transmission and reception filter 15 for Band 40 provided between the common terminal 60 and the input and output terminal 50 (two-dotted line). The inductance value of the inductance element 21 preferably is set to about 5.6 nH, for example.

As shown in FIG. 7A, insertion loss in the pass bands of the five filter elements is significantly reduced. This significant reduction in insertion loss is due to notches not occurring in the pass bands of the five filter elements, but instead occurring in a frequency range lower than the pass bands.

Figure 7B:
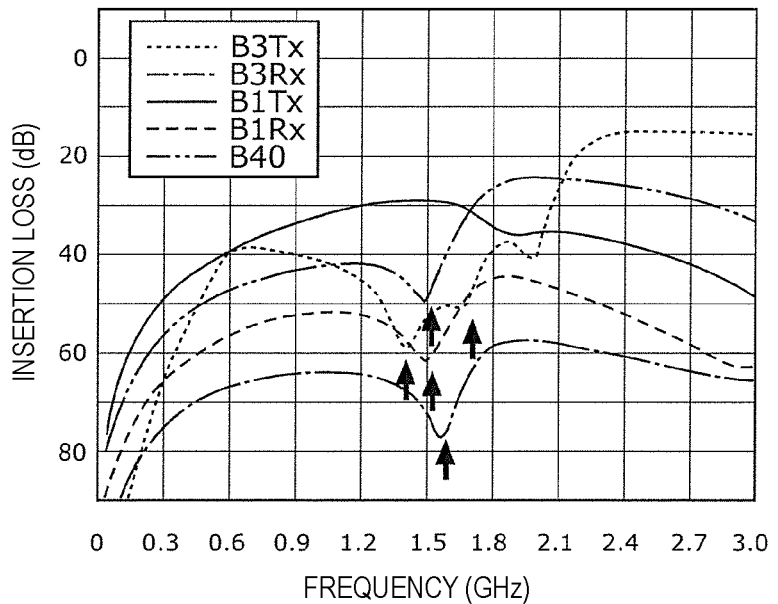
FIG. 7B is a graph showing frequency characteristics of a capacitance equivalent circuit of a multiplexer according to the first preferred embodiment of the present invention.

FIG. 7B is a graph showing frequency characteristics of capacitance equivalent circuits of the multiplexer 1 according to a preferred embodiment of the present invention. In FIG. 7B, simulation results of the frequency characteristics of the capacitance equivalent circuits of individual filter elements are shown. Except for the frequency characteristics of the capacitance equivalent circuit of the transmission filter 11 for Band 1, a notch appears in individual frequency characteristics. The frequencies of the notches in the graph of FIG. 7B are equal or substantially equal to the frequencies of the notches in the graph of FIG. 7A. Therefore, it may be determined that the notches in the graph of FIG. 7A are generated by the LC series resonant circuit including the inductance element 21 and the transmission filter 11.

Figure 8A:
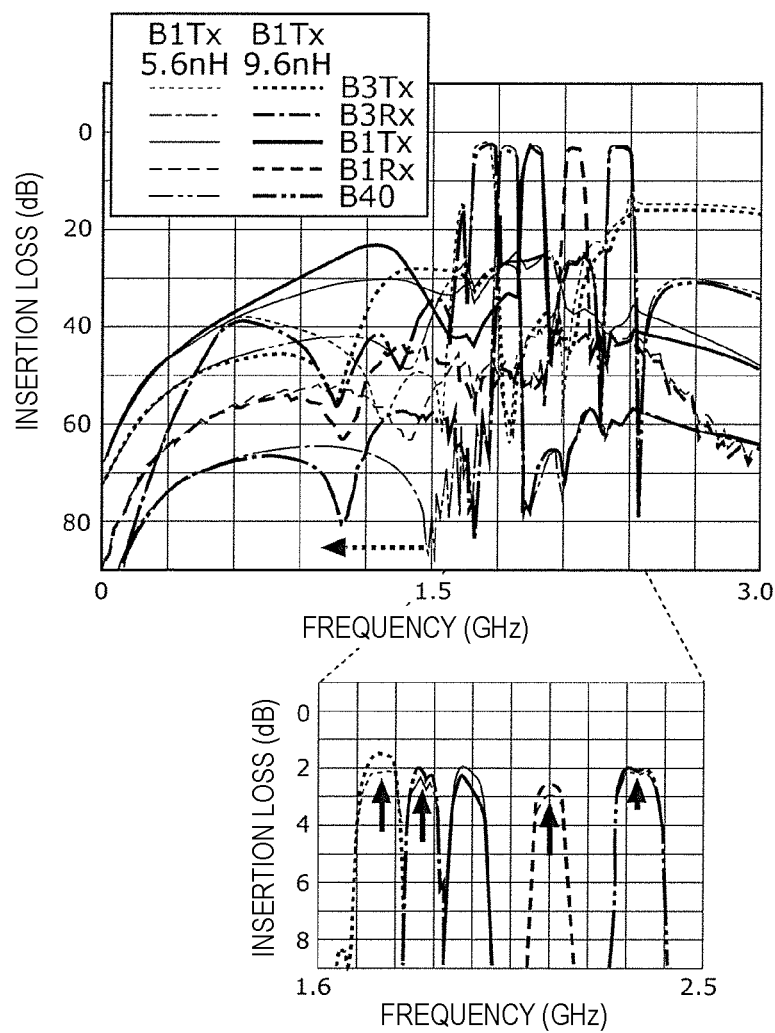
FIG. 8A is a graph showing changes in bandpass characteristics of a multiplexer according to the first preferred embodiment of the present invention in the case where the inductance value of an inductance element is increased.
Figure 10A:
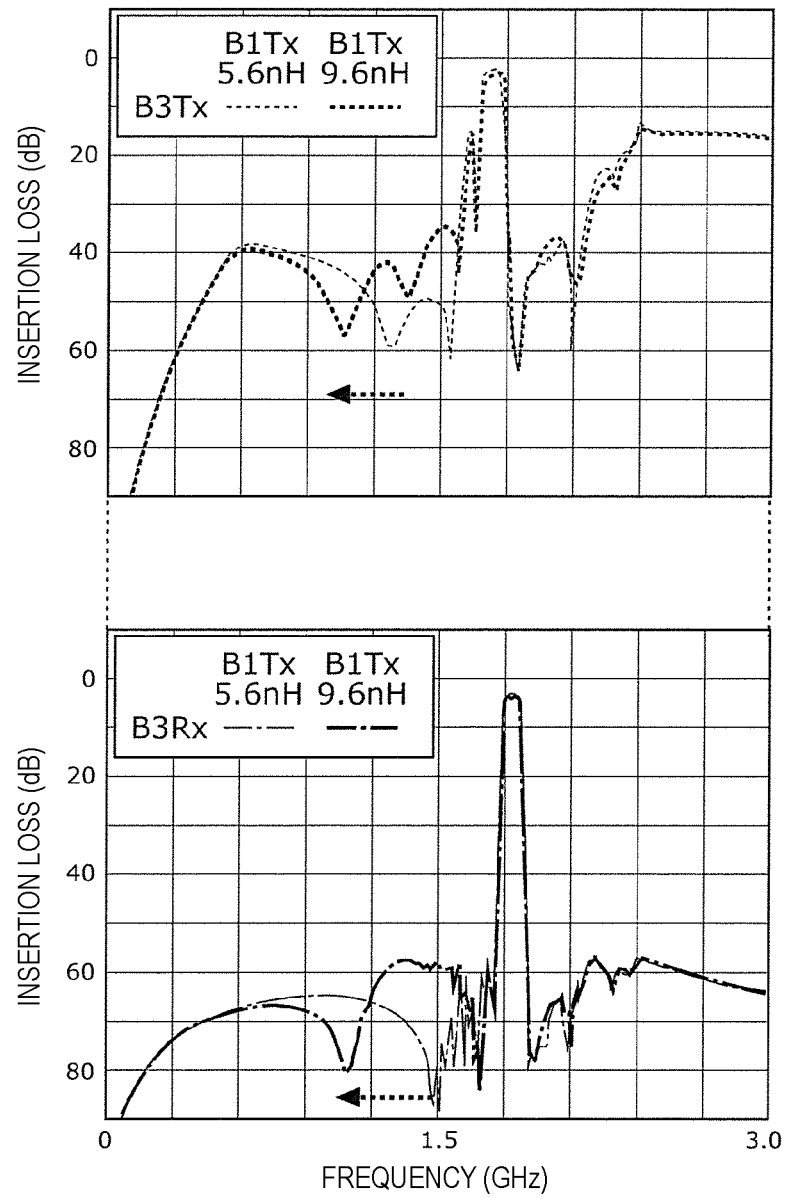
FIG. 10A is a graph showing bandpass characteristics of filter elements for Band 3 in the case where the inductance value of an inductance element is increased.
Figure 11A:
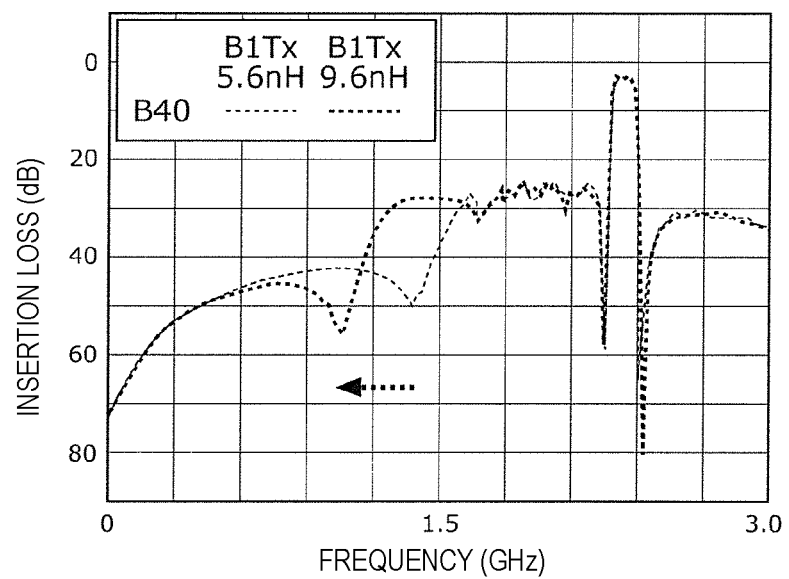
FIG. 11A is a graph showing bandpass characteristics of filter elements for Band 40 in the case where the inductance value of an inductance element is increased.

FIG. 8A is a graph showing changes in the bandpass characteristics of the multiplexer 1 when the inductance value of an inductance element is increased. As in FIG. 7A, the bandpass characteristics of the five filter elements are shown, and the bandpass characteristics (thick line) when the inductance value of the inductance element 21 is increased (for example, about 9.6 nH) are shown in FIG. 8A. Furthermore, for clarity, bandpass characteristics of individual bands are shown in FIGS. 9A, 10A, and 11A.

Figure 9A:
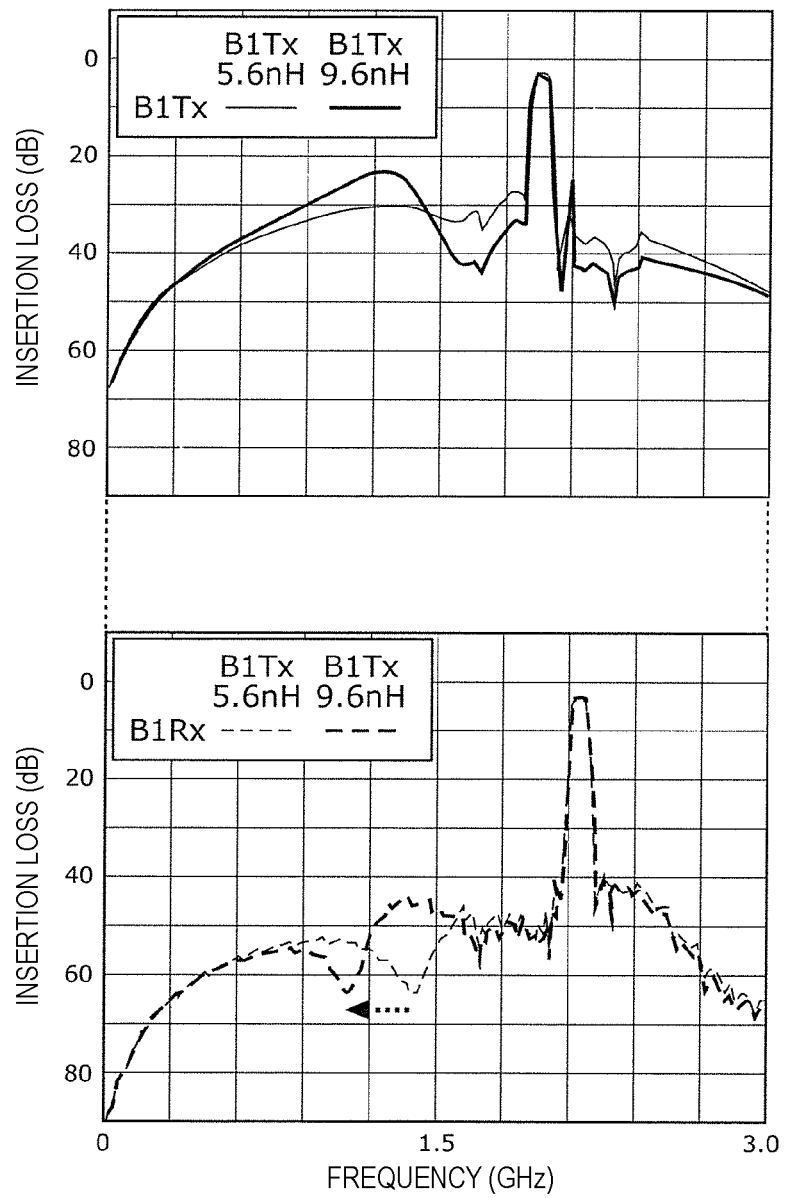
FIG. 9A is a graph showing bandpass characteristics of filter elements for Band 1 in the case where the inductance value of an inductance element is increased.

FIG. 9A is a graph showing the bandpass characteristics of the filter elements for Band 1 when the inductance value of an inductance element is increased. FIG. 10A is a graph showing the bandpass characteristics of the filter elements for Band 3 when the inductance value of an inductance element is increased. FIG. 11A is a graph showing the bandpass characteristics of the filter elements for Band 40 when the inductance value of an inductance element is increased.

When the inductance value of the inductance element 21 is increased from about 5.6 nH to about 9.6 nH, for example, the resonant frequency fr defined by Equation 1 is shifted to a lower frequency side. Thus, as shown in the lower graph of FIG. 8A, insertion loss of four filters other than the transmission filter 11 is decreased. This is because signal leakage occurring in a transmission signal path for Band 1 is significantly reduced or prevented by setting the resonant frequency fr providing a notch to a lower frequency side.

Figure 8B:
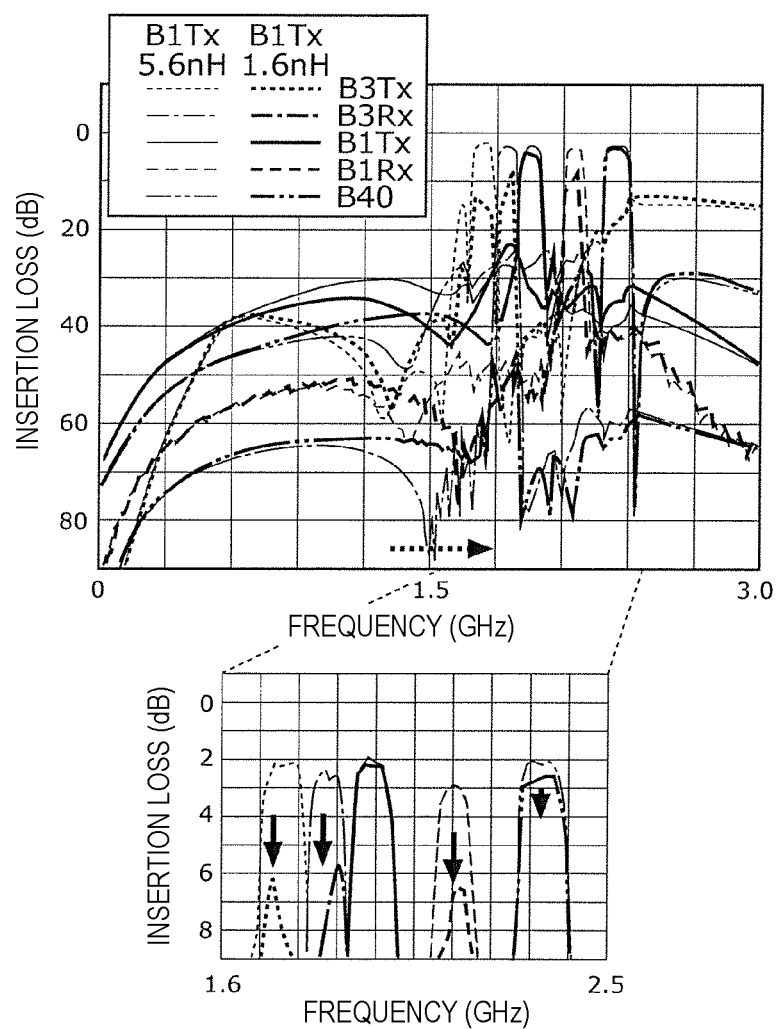
FIG. 8B is a graph showing changes in bandpass characteristics of a multiplexer according to the first preferred embodiment of the present invention in the case where the inductance value of an inductance element is decreased.
Figure 10B:
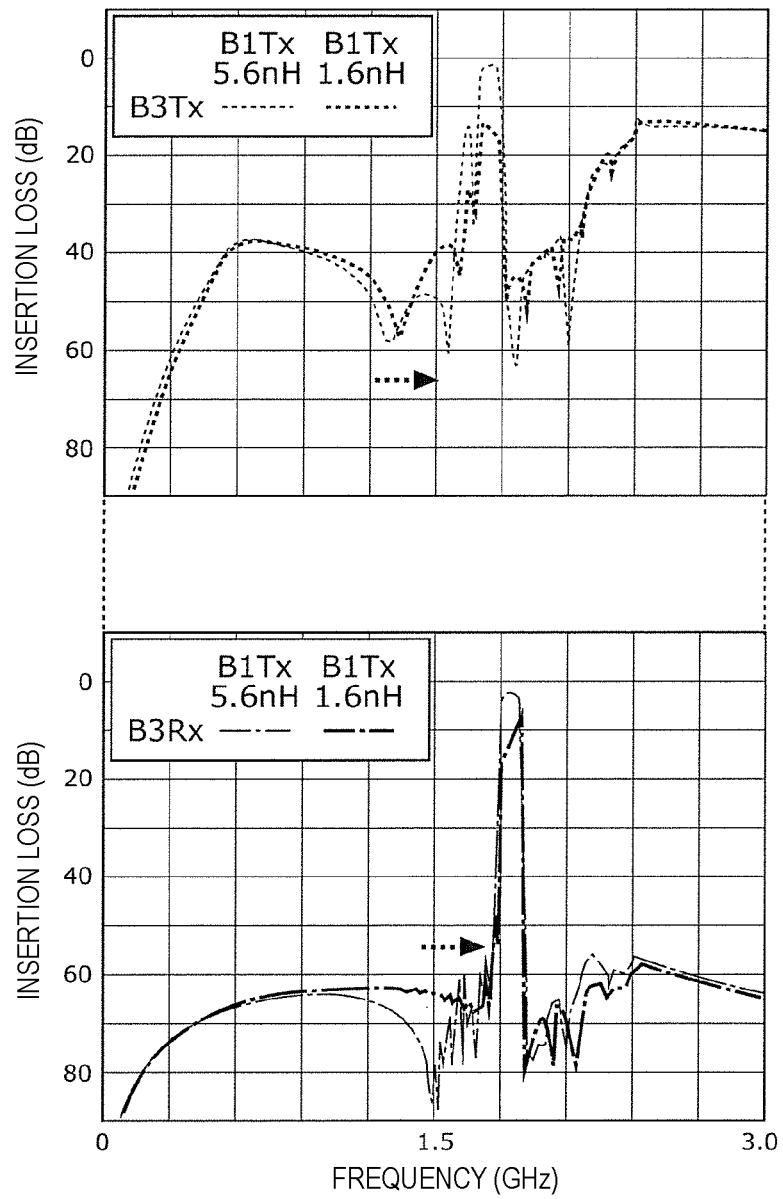
FIG. 10B is a graph showing bandpass characteristics of filter elements for Band 3 in the case where the inductance value of an inductance element is decreased.
Figure 11B:
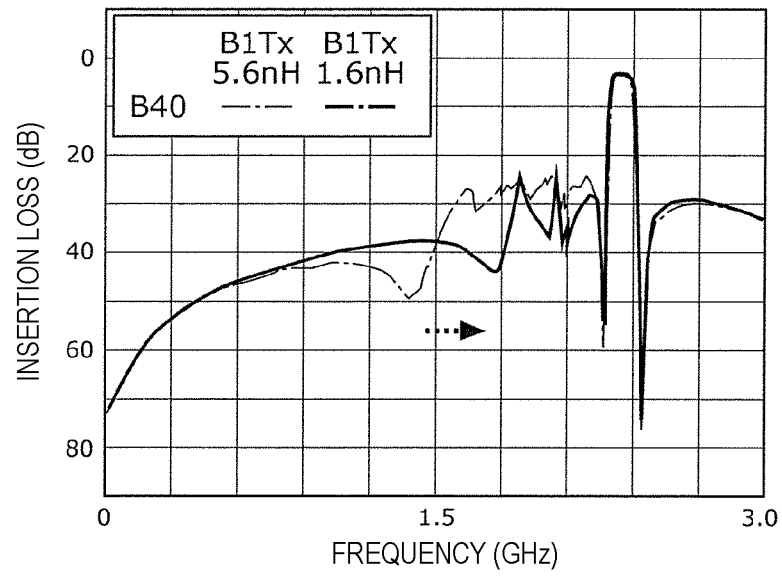
FIG. 11B is a graph showing bandpass characteristics of filter elements for Band 40 in the case where the inductance value of an inductance element is decreased.

FIG. 8B is a graph showing changes in the bandpass characteristics of a multiplexer when the inductance value of an inductance element is decreased. As in FIG. 7A, the bandpass characteristics of the five filter elements are shown, and the bandpass characteristics (thick line) when the inductance value of the inductance element 21 is decreased (for example, about 1.6 nH) are shown in FIG. 8B. Furthermore, for clarity, bandpass characteristics of individual frequency bands are shown in FIGS. 9B, 10B, and 11B.

Figure 9B:
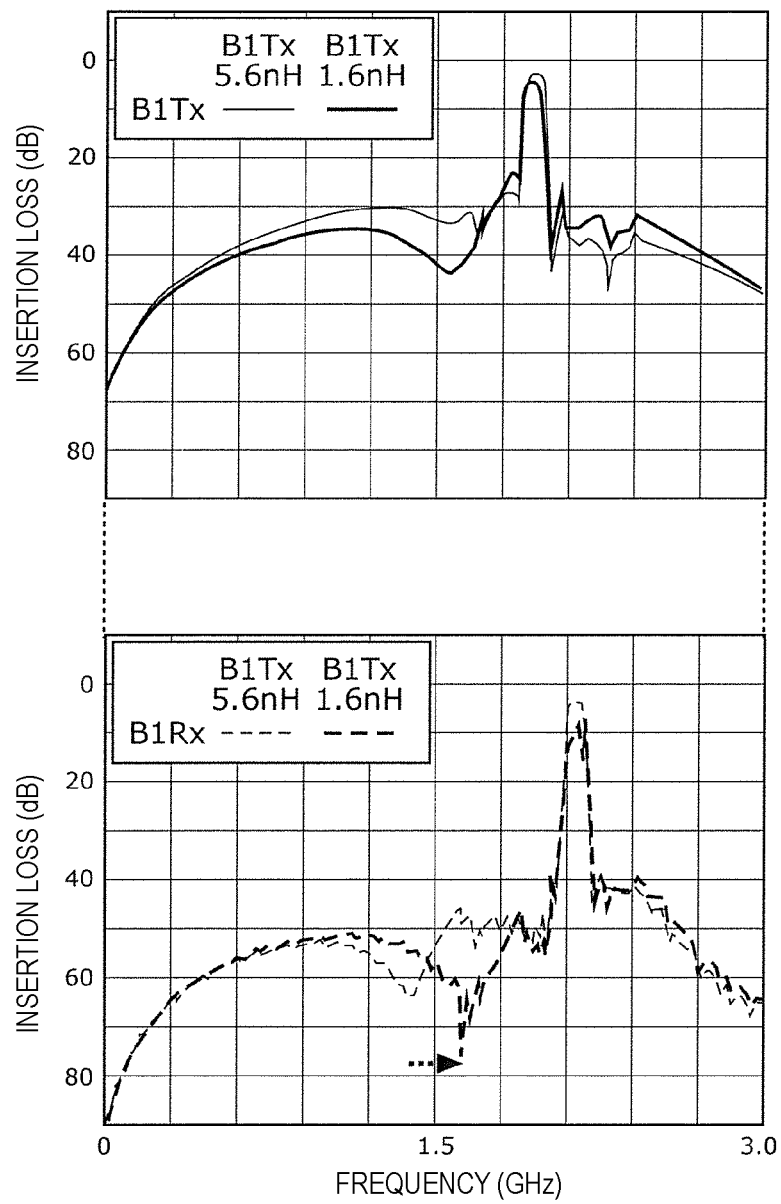
FIG. 9B is a graph showing bandpass characteristics of filter elements for Band 1 in the case where the inductance value of an inductance element is decreased.

FIG. 9B is a graph showing the bandpass characteristics of the filter elements for Band 1 when the inductance value of an inductance element is decreased. FIG. 10B is a graph showing the bandpass characteristics of the filter elements for Band 3 when the inductance value of an inductance element is decreased. FIG. 11B is a graph showing bandpass characteristics of the filter elements for Band 40 when the inductance value of an inductance element is decreased.

When the inductance value of the inductance element 21 is decreased from about 5.6 nH to about 1.6 nH, for example, the resonant frequency fr defined by Equation 1 is shifted to a higher frequency side. Thus, as shown in the lower graph of FIG. 8B, insertion loss of four filters other than the transmission filter 11 is increased. This is because signal leakage occurring in a transmission signal path for Band 1 is increased by shifting the resonant frequency fr providing a notch to a frequency range higher than the pass band of the multiplexer.

The inductance value of the inductance element 21 shown in FIGS. 8A and 8B is not determined only by shifting the resonant frequency fr of a notch. The inductance value also affects adjustment of other bandpass characteristics. Therefore, the inductance value is not able to be changed only to adjust of the resonant frequency fr. From this point of view, to set a lower resonant frequency fr, an arrangement of the inductance element 21 between the common terminal 60 and a filter with the largest capacitance in the multiplexer 1 is preferred to ensure low-loss characteristics of the multiplexer 1.

In the present preferred embodiment, the resonant frequency fr of an LC series resonant circuit preferably is generated in a frequency range lower than the pass band of the multiplexer 1 and is described with reference to an example in the form of a pentaplexer. However, a multiplexer according to a preferred embodiment of the present invention may include an arrangement in which the resonant frequency fr of the LC series resonant circuit is generated in a frequency range higher than the pass band of the multiplexer 1.

That is, a multiplexer which transmits and receives high-frequency signals in a plurality of frequency bands via the antenna element 4 may include the common terminal 60 which is connected to an impedance matching element at a connection path with the antenna element 4, a plurality of filter elements which include different pass bands and which are connected to the antenna element 4 with the common terminal 60 therebetween, and an inductance element which is arranged in series between a second filter element with the smallest capacitance when viewed from the antenna element 4 side among the plurality of filter elements and the common terminal 60, wherein the resonant frequency of an LC series resonant circuit including an inductive component of the inductance element and a capacitive component of the second filter element is higher than any of pass bands of the plurality of filter elements.

Accordingly, the resonant frequency fr of the LC series resonant circuit including the inductance element and the second filter element connected to the inductance element may be set to a frequency range higher than the pass band of the multiplexer. Therefore, in particular, loss at a high frequency end of the pass band of the multiplexer may be decreased.

Compared with a multiplexer of a related art, in the multiplexer 1 according to a preferred embodiment of the present invention described above: (1) an inductance element is arranged in series between a first filter element with the largest capacitance when viewed from an antenna element side among a plurality of filter elements and a common terminal, and (2) the resonant frequency fr of an LC series resonant circuit including an inductive component of the inductance element and a capacitive component of the first filter element is lower than any of pass bands of the plurality of filter elements.

With respect to a multiplexer with a small number of bands, impedance matching between the antenna element and each signal path may be provided by arranging an impedance matching circuit between the antenna element and the common terminal. However, as the number of bands increases, it becomes more difficult to provide impedance matching between the antenna element and each of the plurality of filter elements.

Thus, an inductance element is connected in series between one filter element and a common terminal. Accordingly, the inductive impedance of the one filter element when viewed from the antenna element side and the capacitive impedance of the other filter elements connected in parallel to the common terminal may provide a complex conjugate relationship. Therefore, even in the case where an increase in the number of filter elements connected in parallel to the antenna element increases the capacitive impedance, high-precision impedance matching may be provided between the antenna element and the plurality of filter elements.

However, when the inductance element is connected in series between the one filter element and the common terminal, LC series resonance is generated by the inductive component of the inductance element and the capacitive component (C) of the first filter element. If the resonant frequency fr of the LC series resonance is presented in pass bands of the filter elements, insertion loss in the pass bands is increased by notches defined by the resonant frequency fr.

In contrast, the multiplexer 1 according to the preferred embodiment described above decreases loss in the pass band of the multiplexer 1 by providing a notch due to the LC series resonance of the inductance element and the first filter element with the largest capacitance when viewed from the antenna element side to be generated outside the pass band of the multiplexer 1 (preferably in a frequency range lower than the pass band of the multiplexer 1, for example). That is, with the multiplexer 1 including the above-described features (1) and (2), even if the number of bands to be supported increases, insertion loss in the pass bands of filters that define the bands is significantly decreased.

Second Preferred Embodiment

Figure 12:
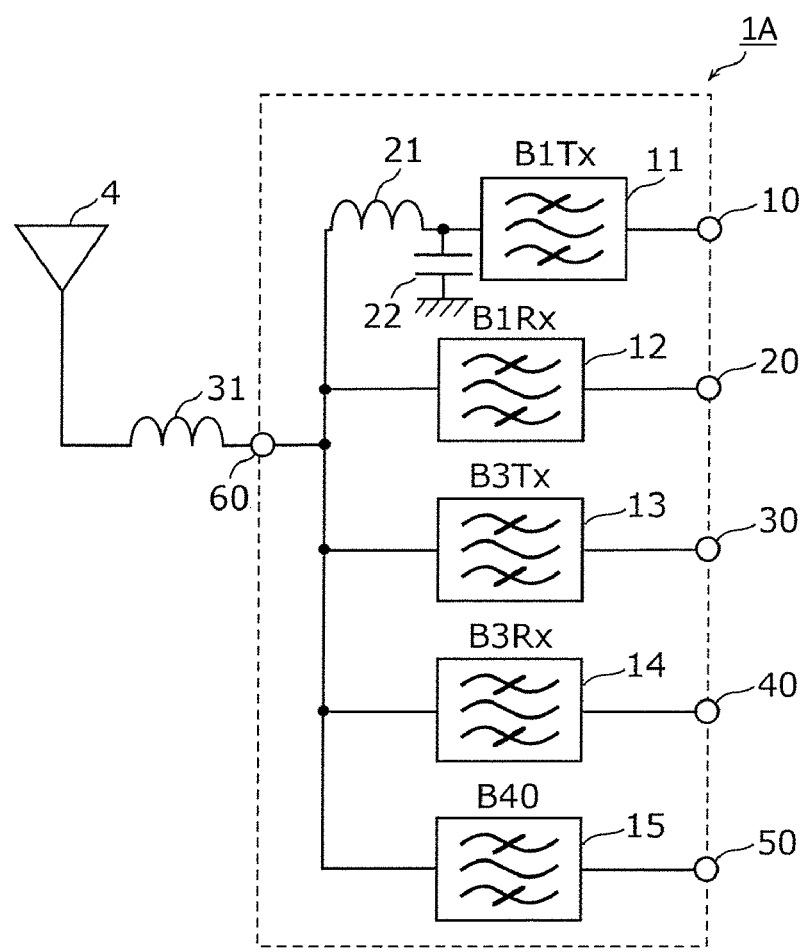
FIG. 12 is a circuit diagram of a multiplexer according to a second preferred embodiment of the present invention.

As illustrated in FIG. 12, a multiplexer 1A according to a second preferred embodiment of the present invention includes the same configuration as that of the first preferred embodiment, but a capacitance element 22 is preferably connected in parallel between a reference terminal (for example, ground) and a connection point of the inductance element 21 and the transmission filter 11. The second preferred embodiment provides advantages similar to those of the first preferred embodiment.

Figure 13:
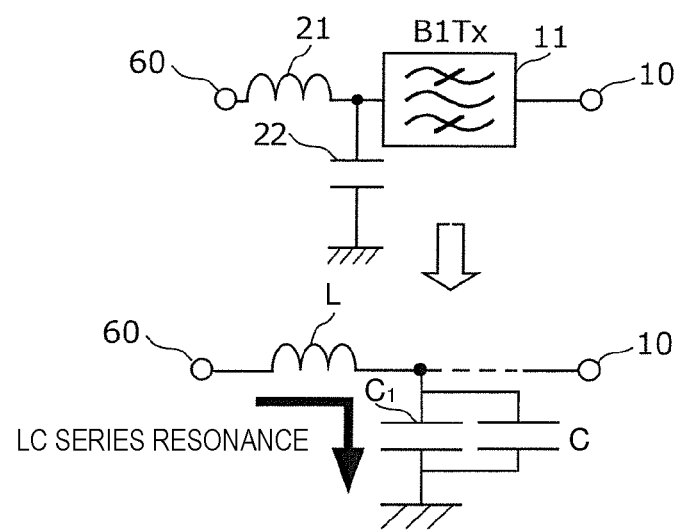
FIG. 13 is a diagram showing an LC series resonant circuit including an inductor element, a capacitor element, and a filter element according to the second preferred embodiment of the present invention.

FIG. 13 is a diagram showing an LC series resonant circuit including an inductor element, a capacitor element, and a filter element according to the second preferred embodiment of the present invention. As shown in FIG. 13, for example, in the case where the inductance element 21 is connected in series between the transmission filter 11 and the common terminal 60 and the capacitance element 22 is connected in parallel between a reference terminal and the connection point of the first inductance element 21 and the transmission filter 11, LC series resonance is generated at a path from the common terminal 60 to the reference terminal (for example, ground) by an inductive component (L) of the inductance element 21, a capacitive component ($C_1$) of the capacitance element 22, and a capacitive component (C) of the transmission filter 11. The resonant frequency fr of the LC series resonance is represented by Equation 2.

$$fr = \frac{1}{2\pi\sqrt{L(C + C_1)}}$$

Third Preferred Embodiment

Figure 14:
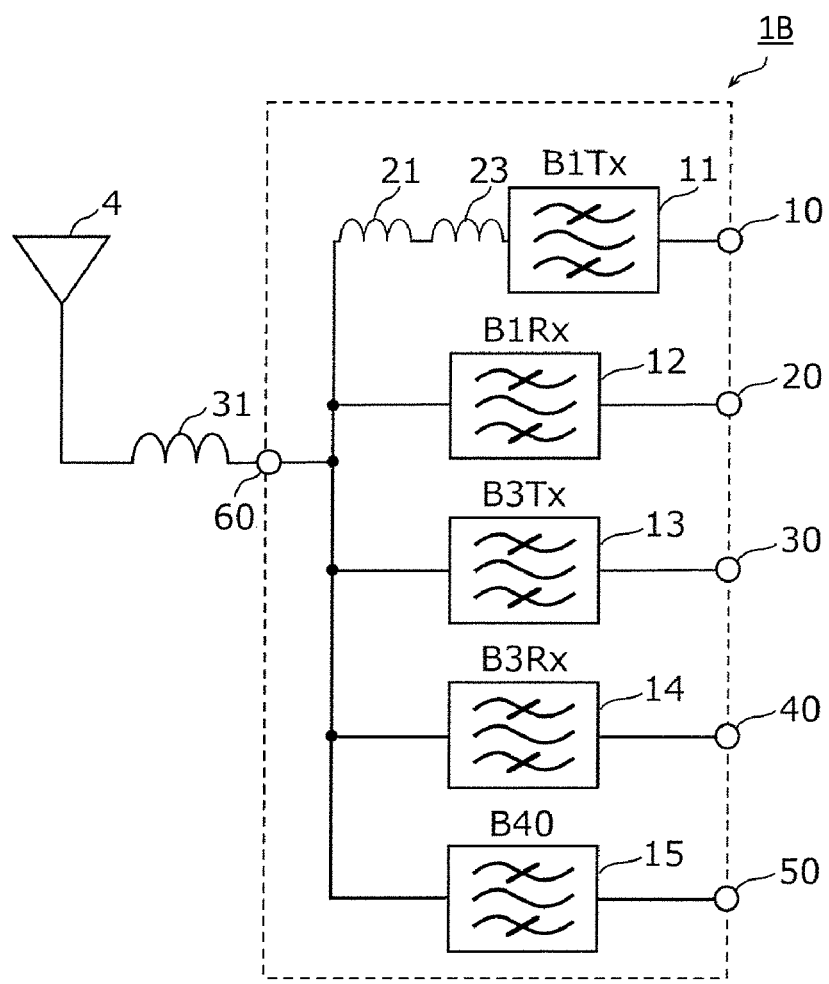
FIG. 14 is a circuit diagram of a multiplexer according to a third preferred embodiment of the present invention.

As illustrated in FIG. 14, a multiplexer 1B according to a third preferred embodiment of the present invention includes the same configuration as that of the first preferred embodiment, but a second inductance element 23 is preferably connected in series between the inductance element 21 and the transmission filter 11. The third preferred embodiment provides advantages similar to those of the first preferred embodiment.

Figure 15:
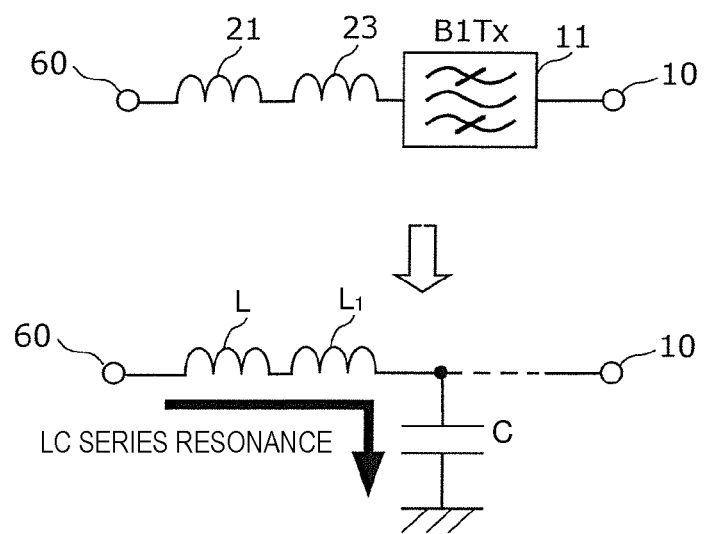
FIG. 15 is a diagram showing an LC series resonant circuit including a first inductor element, a second inductor element, and a filter element according to the third preferred embodiment of the present invention.

FIG. 15 is a diagram showing an LC series resonant circuit including a first inductor element, a second inductor element, and a filter element according to the third preferred embodiment of the present invention. As shown in FIG. 15, for example, in the case where the first inductance element 21 and the second inductance element 23 are connected in series between the transmission filter 11 and the common terminal 60, LC series resonance is generated at a path from the common terminal 60 to a reference terminal (for example, ground) by an inductive component (L) of the first inductance element 21, an inductive component ($L_1$) of the second inductance element 23, and a capacitive component (C) of the transmission filter 11. The resonant frequency fr of the LC series resonance is represented by Equation 3.

$$fr = \frac{1}{2\pi\sqrt{(L + L_1)C}}$$

Fourth Preferred Embodiment

Figure 16:
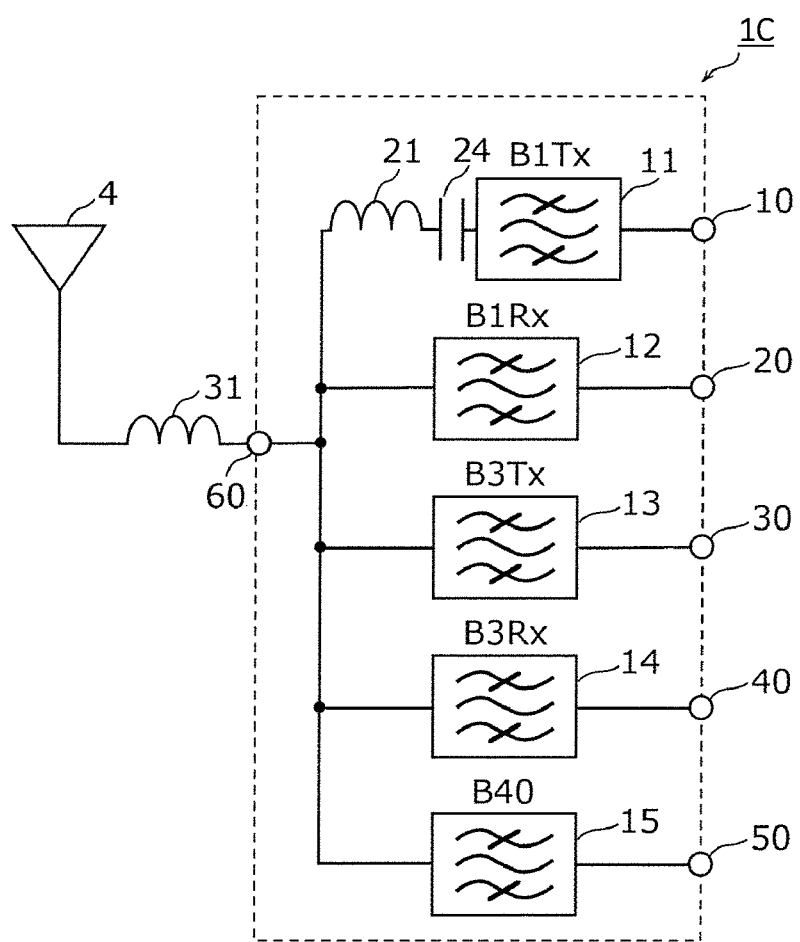
FIG. 16 is a circuit diagram of a multiplexer according to a fourth preferred embodiment of the present invention.

As illustrated in FIG. 16, a multiplexer 1C according to a fourth preferred embodiment of the present invention includes the same configuration as that of the first preferred embodiment, but a capacitance element 24 is preferably connected in series between the inductance element 21 and the transmission filter 11. The fourth preferred embodiment provides advantages similar to those of the first preferred embodiment.

Figure 17:
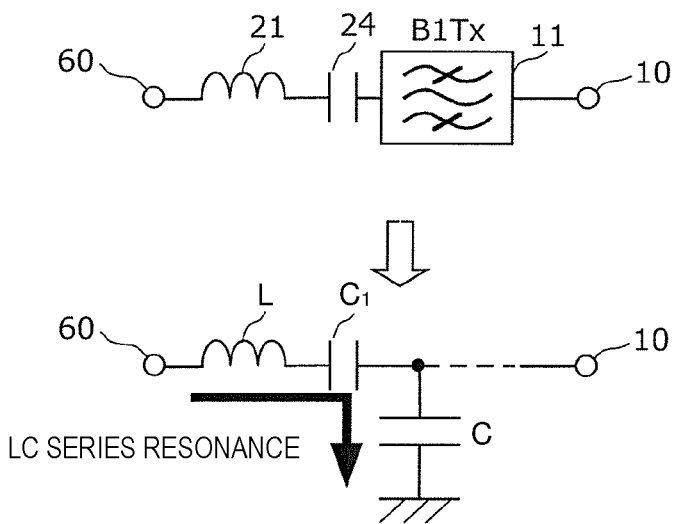
FIG. 17 is a diagram showing an LC series resonant circuit including an inductor element, a capacitor element, and a filter element according to the fourth preferred embodiment of the present invention.

FIG. 17 is a diagram showing an LC series resonant circuit including a first inductor element, a capacitor element, and a filter element according to the fourth preferred embodiment of the present invention. As shown in FIG. 17, for example, in the case where the inductance element 21 and the capacitance element 24 are connected in series between the transmission filter 11 and the common terminal 60, LC series resonance is generated at a path from the common terminal 60 to a reference terminal (for example, ground) by an inductive component (L) of the inductance element 21, a capacitive component ($C_1$) of the capacitance element 24, and a capacitive component (C) of the transmission filter 11. The resonant frequency fr of the LC series resonance is represented by Equation 4.

$$fr = \frac{1}{2\pi} \sqrt{\frac{C + C_1}{LC_1 C}}$$

Fifth Preferred Embodiment

Figure 18:
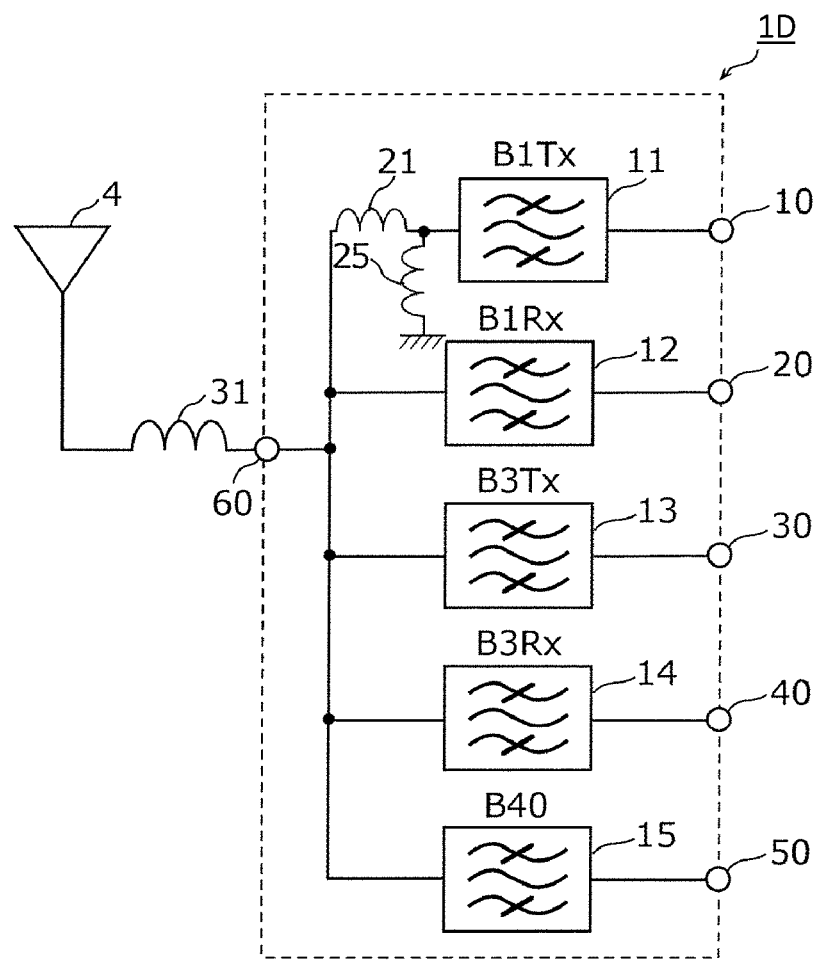
FIG. 18 is a circuit diagram of a multiplexer according to a fifth preferred embodiment of the present invention.

As illustrated in FIG. 18, a multiplexer 1D of a fifth preferred embodiment of the present invention includes the same configuration as that of the first preferred embodiment, but a second inductance element 25 is preferably connected in parallel between a reference terminal (for example, ground) and a connection point of the first inductance element 21 and the transmission filter 11. The fifth preferred embodiment provides advantages similar to those of the first preferred embodiment.

Figure 19:
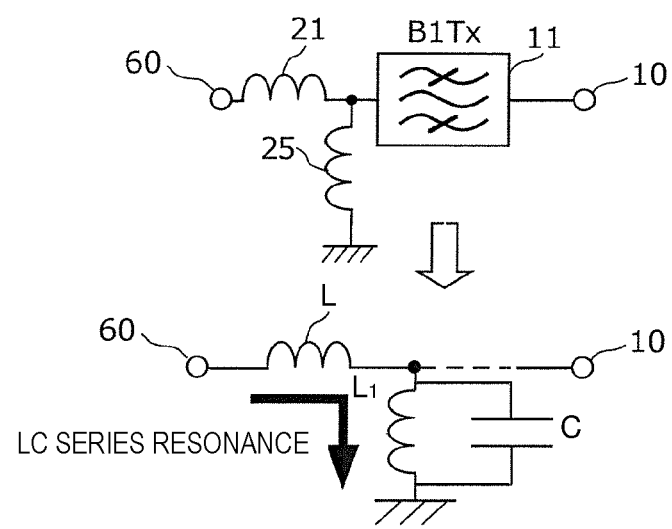
FIG. 19 is a diagram showing an LC series resonant circuit including a first inductor element, a second inductor element, and a filter element according to the fifth preferred embodiment of the present invention.

FIG. 19 is a diagram showing an LC series resonant circuit including a first inductor element, a second inductor element, and a filter element according to the fifth preferred embodiment of the present invention. As shown in FIG. 19, for example, in the case where the first inductance element 21 is connected in series between the transmission filter 11 and the common terminal 60 and the second inductance element 25 is connected in parallel between a reference terminal and the connection point of the first inductance element 21 and the transmission filter 11, LC series resonance is generated at a path from the common terminal 60 to the reference terminal (for example, ground) by an inductive component (L) of the first inductance element 21, an inductive component ($L_1$) of the second inductance element 25, and a capacitive component (C) of the transmission filter 11. The resonant frequency fr of the LC series resonance is represented by Equation 5.

$$fr = \frac{1}{2\pi} \sqrt{\frac{L + L_1}{LL_1 C}}$$

Other Preferred Embodiments

Multiplexers according to preferred embodiments of the present invention have been described above. However, multiplexers according to the present invention are not limited to the preferred embodiments described above. Other preferred embodiments which are implemented by combining any components in the preferred embodiments, modifications obtained by making modifications to the preferred embodiments which are conceived by those skilled in the art without departing from the scope of the present invention, various apparatuses including a multiplexer according to the present disclosure may also be included in the present invention.

For example, a pentaplexer with five frequency bands has been described above with respect to a preferred embodiment of the present invention. According to other preferred embodiments of the present invention, multiplexers may include two or more bands, for example. That is, the features of a multiplexer according to a preferred embodiment of the present invention may be applied to multiplexers including two to four bands, such as a duplexer, a diplexer, a triplexer, and a quadplexer, or multiplexers including six or more bands. As the number of bands increases, that is, as the number of filter elements including different pass bands increases, it is more advantageous to apply the features of a multiplexer according to a preferred embodiment of the present invention.

Furthermore, a multiplexer performing both transmission and reception has been described above with respect to a preferred embodiment of the present invention. However, the present invention may also be applied to a transmission apparatus including a plurality of bands that only performs transmission and a reception apparatus including a plurality of bands that only performs reception, for example. Even in this case, the transmission apparatus or the reception apparatus which includes the features as described in the preferred embodiments described above may provide advantages similar to those of the multiplexer 1 according to the preferred embodiments described above.

Furthermore, the multiplexer 1 according to a preferred embodiment of the present invention may further include an inductance element 31 connected in series between the antenna element 4 and the common terminal 60, for example. The multiplexer 1 according to a preferred embodiment of the present invention may include a plurality of filter elements with different pass bands and the inductance elements 21 and 31 with a chip structure mounted on a high-frequency substrate, for example.

Accordingly, an antenna front-end unit with low-loss characteristics may be provided only by connecting the antenna element 4 to the multiplexer. Therefore, circuit implementation may be easily provided.

Furthermore, the inductance elements 21 and 31 may be chip inductors or may be defined by conductor patterns of a high-frequency substrate, for example.

Furthermore, the multiplexer 1 according to a preferred embodiment of the present invention is not limited to a multiplexer including a combination of Band 1, Band 3, and Band 40, as described above. Any combination of bands may be included, for example.

Furthermore, the piezoelectric substrate 510 of an elastic surface acoustic wave filter may include a multilayer body structure in which a high acoustic velocity support substrate, a low acoustic velocity film, and a piezoelectric film are stacked in this order. The piezoelectric film preferably includes, for example, $LiTaO_3$ piezoelectric single crystal or piezoelectric ceramics. The piezoelectric film has a thickness of, for example, about 600 nm. The high acoustic velocity support substrate is a substrate which supports the low acoustic velocity film, the piezoelectric film, and the IDT electrode 54. Furthermore, the high acoustic velocity support substrate is a substrate in which bulk waves propagate at higher acoustic velocity than elastic waves of surface acoustic waves or boundary waves propagating in the piezoelectric film, traps elastic surface acoustic waves into a portion in which the piezoelectric film and the low acoustic velocity film are stacked, and does not leak the elastic surface acoustic waves below the high acoustic velocity support substrate. The high acoustic velocity support substrate is, for example, a silicon substrate, and has a thickness of, for example, about 200 μm. The low acoustic velocity film is a film in which bulk waves propagate at lower velocity than bulk waves propagating in the piezoelectric film, and is arranged between the piezoelectric film and the high acoustic velocity support substrate. With this structure and features that energy of elastic waves is substantially concentrated on a low acoustic velocity medium, leakage of energy of elastic surface acoustic waves outside an IDT electrode may be significantly reduced or prevented. The low acoustic velocity film is, for example, a film containing silicon dioxide as a main component, and has a thickness of, for example, about 670 nm. With this multilayer body structure, compared to the structure including the piezoelectric substrate 510 as a single layer, the Q value of resonant frequency and anti-resonant frequency may be significantly increased. That is, an elastic surface acoustic wave resonator may include a high Q value, and therefore, a filter with a low insertion loss may be provided by the elastic surface acoustic wave resonator.

Furthermore, to provide impedance matching among a plurality of elastic surface acoustic wave filters, a circuit element such as an inductance element and a capacitance element may be included, for example, the inductance element 21 may be connected to a side of the transmission filter 11 near the common terminal 60. Accordingly, the Q value of each resonator is assumed to be equivalently decreased. However, even in such a case, with the multilayer body structure of a piezoelectric substrate, the Q value of each resonator is maintained at a high level. Therefore, an elastic surface acoustic wave filter including low-loss characteristics in a band may be provided.

The high acoustic velocity support substrate may include a structure in which a support substrate and a high acoustic velocity film in which bulk waves propagate at higher acoustic velocity than elastic waves of surface acoustic waves or boundary waves propagating in a piezoelectric film are stacked. In this case, a piezoelectric substance such as sapphire, lithium tantalate, lithium niobate, or crystal, ceramics such as alumina, magnesia, silicon nitride, aluminum nitride, silicon carbide, zirconia, cordierite, mullite, steatite, or forsterite, a dielectric substance such as glass, a semiconductor such as silicon or gallium nitrite, a resin substrate, or the like may be included as the support substrate. Furthermore, various high acoustic velocity materials such as aluminum nitride, aluminum oxide, silicon carbide, silicon nitride, silicon oxynitride, a DLC film, diamond, a medium containing one of these materials as a main component, or a medium containing a mixture of the above materials as a main component, may be included in the high acoustic velocity film.

Furthermore, elastic surface acoustic wave filters including IDT electrodes as a transmission filter, a reception filter, and a transmission and reception filter which configure a multiplexer, a transmission apparatus, and a reception apparatus have been described above with respect to the preferred embodiments of the present invention. However, individual filters that define a multiplexer, a transmission apparatus, and a reception apparatus according to preferred embodiments of the present invention may be elastic wave filters including series resonators and parallel resonators that utilize elastic boundary waves and bulk acoustic waves (BAWs). Elastic wave filters tend to include a capacitive impedance. Therefore, an impedance matching approach preferably includes arranging an inductance element in series between a common terminal and one filter element among a plurality of filter elements and providing a complex conjugate relationship between the inductive impedance of the one filter element and the capacitive impedance of the other filter elements connected in parallel. Therefore, effects similar to those provided by a multiplexer, a transmission apparatus, and a reception apparatus according to preferred embodiments of the present invention may be provided.

The preferred embodiments of the present invention may be widely implemented, for example, in a communication apparatus such as a cellular phone, as a low-loss multiplexer, in transmission apparatus, and in reception apparatus which may be applied to frequency standards for multi-band and multi-mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multiplexer which transmits and receives high-frequency signals in a plurality of frequency bands via an antenna element, the multiplexer comprising:
   a common terminal connected to an impedance matching element at a connection path connected to the antenna element;
   a plurality of filter elements including different pass bands and connected to the antenna element with the common terminal therebetween;
   an inductance element arranged in series between a first filter element with a largest capacitance when viewed from a side of the antenna element among the plurality of filter elements and the common terminal; and
   a circuit element arranged in series or in parallel between the inductance element and the first filter element with the largest capacitance; wherein
   when the circuit element is arranged in parallel between the inductance element and the first filter element, the circuit element is connected to a reference terminal on a first side and to a connection point of the inductance element and the first filter element on a second side;
   the inductance element is a first inductance element;
   the circuit element includes a second inductance element or a capacitance element;
   an inductive component of the inductance element, a capacitive component of the first filter element, and an inductive component or a capacitive component of the circuit element define an LC series resonant circuit; and
   a resonant frequency of the LC series resonant circuit is lower than any of the pass bands of the plurality of filter elements.

2. The multiplexer according to claim 1, wherein:
   the multiplexer transmits and receives high-frequency signals in five or more frequency bands; and
   the plurality of filter elements include five or more filter elements.

3. The multiplexer according to claim 1, wherein each of the plurality of filter elements is an elastic surface acoustic wave filter or an elastic wave filter.

4. The multiplexer according to claim 3, wherein at least one of the plurality of filter elements includes a series resonator arranged in series between the common terminal and a first terminal and a parallel resonator between a connection path from the common terminal to the first terminal and a reference terminal.

5. The multiplexer according to claim 4, wherein at least one of the series resonator and the parallel resonator includes a piezoelectric substrate and an interdigital transducer (IDT) electrode.

6. The multiplexer according to claim 5, wherein the IDT electrode includes a plurality of electrode fingers which are parallel or substantially parallel to each other and a bulbar electrode connecting the plurality of electrode fingers.

7. The multiplexer according to claim 5, wherein the IDT electrode includes a multilayer body structure including a piezoelectric substrate and an electrode layer.

8. The multiplexer according to claim 5, wherein the IDT electrode includes a pair of IDT electrodes facing each other.

9. The multiplexer according to claim 4, wherein the series resonator is included in a plurality of series resonators that are connected in series to each other between the common terminal and a transmission input terminal of the multiplexer.

10. The multiplexer according to claim 4, wherein each of the reference terminals is a ground terminal.

11. The multiplexer according to claim 1, wherein the multiplexer further comprises the impedance matching element.

12. The multiplexer according to claim 1, wherein the plurality of filter elements include a plurality of transmission filter elements including different transmission pass bands and connected to the antenna element with the common terminal therebetween.

13. The multiplexer according to claim 1, wherein the plurality of filter elements include a plurality of transmission filter elements including different transmission pass bands and connected to the antenna element with the common terminal therebetween.

14. The multiplexer according to claim 1, wherein the plurality of filter elements includes at least one transmission filter and at least one reception filter.

15. The multiplexer according to claim 1, wherein a number of filters included in the at least one transmission filter is the same as a number of filters included in the at least one reception filter.

16. The multiplexer according to claim 1, wherein each of the plurality of filter elements is an unbalanced input-unbalanced output filter.

17. The multiplexer according to claim 1, wherein each of the plurality of filter elements is connected directly to the common terminal.

18. A multiplexer which transmits and receives high-frequency signals in a plurality of frequency bands via an antenna element, the multiplexer comprising:

a common terminal connected to an impedance matching element at a connection path connected to the antenna element;

a plurality of filter elements including different pass bands and connected to the antenna element with the common terminal therebetween;

an inductance element arranged in series between a second filter element with a smallest capacitance when viewed from a side of the antenna element among the plurality of filter elements and the common terminal; and a circuit element arranged in series or in parallel between the inductance element and the second filter element with the smallest capacitance; wherein when the circuit element is arranged in parallel between the inductance element and the second filter element, the circuit element is connected to a reference terminal on a first side and to a connection point of the inductance element and the second filter element on a second side;

the inductance element is a first inductance element;

the circuit element includes a second inductance element or a capacitance element;

an inductive component of the inductance element, a capacitive component of the second filter element, and an inductive component or a capacitive component of the circuit element define an LC series resonant circuit; and a resonant frequency of the LC series resonant circuit is higher than any of the pass bands of the plurality of filter elements.

19. The multiplexer according to claim 18, wherein the plurality of filter elements include a plurality of reception filter elements including different reception pass bands and connected to the antenna element with the common terminal therebetween.

20. The multiplexer according to claim 18, wherein the plurality of filter elements include a plurality of reception filter elements including different reception pass bands and connected to the antenna element with the common terminal therebetween.

* * * * *